United States Patent [19]

Ishizuka et al.

[11] Patent Number: 5,532,819
[45] Date of Patent: Jul. 2, 1996

[54] ROTARY DETECTOR HAVING AN OPTICAL SYSTEM FOR GUIDING TWO DIFFRACTED LIGHTS

[75] Inventors: Koh Ishizuka, Urawa; Tetsuharu Nishimura, Kawasaki, both of Japan

[73] Assignee: Canon Kabushiki Kaisha, Tokyo, Japan

[21] Appl. No.: 392,617

[22] Filed: Feb. 22, 1995

Related U.S. Application Data

[63] Continuation of Ser. No. 983,965, Dec. 1, 1992, abandoned.

[30] Foreign Application Priority Data

Dec. 4, 1991 [JP] Japan .................................. 3-348069

[51] Int. Cl.$^6$ .................................................. G01B 9/02
[52] U.S. Cl. ..................... 356/356; 356/351; 250/237 G
[58] Field of Search ..................................... 356/356, 351; 250/237 G, 231.16

[56] References Cited

U.S. PATENT DOCUMENTS

| | | | |
|---|---|---|---|
| 4,772,119 | 9/1988 | Bouwhuis et al. | 356/356 |
| 4,829,342 | 5/1989 | Nishimura | 356/356 |
| 4,868,385 | 9/1989 | Nishimura | 250/231 SE |
| 4,930,895 | 6/1990 | Nishimura et al. | 356/356 |
| 4,967,072 | 10/1990 | Nishimura | 250/231.16 |
| 5,026,985 | 6/1991 | Ishizuka et al. | 250/231.16 |
| 5,051,579 | 9/1991 | Tsukiji et al. | 250/231.16 |
| 5,146,085 | 9/1992 | Ishizuka et al. | 250/231.16 |

FOREIGN PATENT DOCUMENTS

| | | |
|---|---|---|
| 0365806 | 5/1990 | European Pat. Off. . |
| 0397202 | 11/1990 | European Pat. Off. . |
| 0426125 | 5/1991 | European Pat. Off. . |

Primary Examiner—Samuel A. Turner
Assistant Examiner—Robert Kim
Attorney, Agent, or Firm—Fitzpatrick, Cella, Harper & Scinto

[57] ABSTRACT

A rotary detector has a diffraction grating arranged circumferentially and a center at substantially the center of rotation. The rotary detector measures rotational information of a rotating object. The rotary detector is provided with a light source, an irradiating optical system for irradiating luminous flux from the light source to a first point on the diffraction grating, and an optical system for guiding two diffracted luminous fluxes emerging from the first point at an emerging angle and diffracted to have a same order but different signs to be incident at a second point on the diffraction grating at an incident angle relative to a rotational direction of the grating, with the second point positioned substantially opposite to the first point on the diffraction grating with respect to the center of the rotation, and the incident angle is the same angle as the emerging angle. A wave superposing optical system superposes two rediffracted lights diffracted at the second point with the order of the same signs at the first point, respectively, and a detector detects the superposed rediffracted lights. The rotational information of the rotating object is thus measured by the detector.

9 Claims, 21 Drawing Sheets

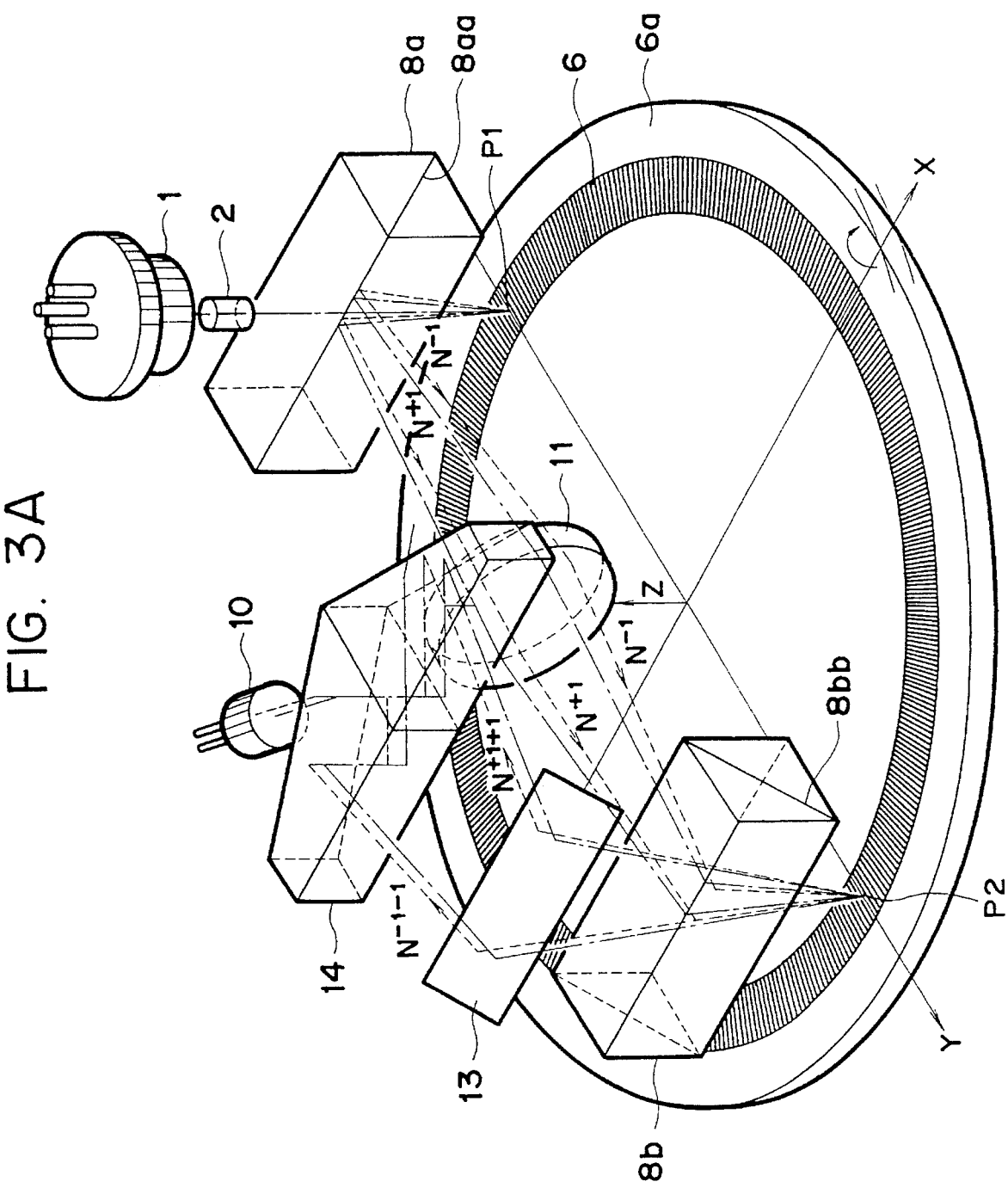

ROTARY DETECTOR HAVING AN OPTICAL SYSTEM FOR GUIDING TWO DIFFRACTED LIGHTS

This application is a continuation of application Ser. No. 07/983,965, filed Dec. 1, 1992, now abandoned.

BACKGROUND OF THE INVENTION

1. Field of the Invention

The present invention relates to a rotary detector such as a rotary encoder. Particularly, the invention is desirably applicable to a rotary encoder for measuring the movement information of a diffraction grating, that is, the movement information of a moving object (scale), in such a manner that a coherent luminous flux such as laser light is incident on the diffraction grating or other minute grating array mounted on the scale to allow diffracted light of given orders from the diffraction grating to interfere with each other for the formation of interference fringes and measure the bright-dark fringes of the interference fringes.

2. Related Background Art

As a measuring instrument, there has hitherto been a rotary encoder widely used in many fields, which is capable of measuring the rotational information such as rotational amounts and rotational directions of a rotating object in an NC machine with high precision, for example, in the unit of submicron orders.

Particularly, as a highly precise, high resolution rotary encoder, there is well known a rotary encoder of a diffraction light interference type wherein a coherent luminous flux such as laser light is allowed to enter the diffraction grating provided at a moving object to enable the diffracted light of given orders emitted from the diffraction grating to interfere with each other and obtain the movement amounts, movement directions, and other data of the moving object by measuring the brightness-darkness of the interference fringes.

FIG. 1A is a view schematically showing the principal part of a portion of a conventional rotary encoder of a diffracted light interference type.

In FIG. 1A, the monochromatic luminous flux which is emitted from a light source 101 enters a minute grating array 105 having a grating pitch P (the number per round of the diffraction grating array being N) composed of the diffraction grating and others on a scale (disc) 105a to emit a plurality of diffracted lights. In this case, the order of luminous flux advancing linearly is defined as zero. On both sides thereof, diffracted lights having orders such as ±1, ±2, ±3, . . . are defined. Further, the rotational direction of the scale 105a is distinguished by providing it with a mark "+" from its reverse direction for which a mark "−" is provided. Then, the rotational angle of the scale 105a is given as θ (deg.) with respect to the wave surface of zeroth light, so the phase of the wave surface of n-th diffracted light is shifted by:

$$2\pi \cdot n \cdot N \cdot \theta / 360.$$

Now, since the wave surface phases of the diffracted lights having different orders are shifted from each other, it is possible to obtain brightness-darkness signals by superposing the optical paths of two diffracted lights with an appropriate optical system to allow them to interfere with each other.

If, for example, using mirrors 109a and 109b, and a beam splitter 103, a + primary diffraction light and a − primary diffraction light are superposed to interfere with each other, their phases are displaced 4π while the scale 105a is rotated by one pitch portion (360/N degrees) of the minute grating. Hence, there occurs the change in the light amount of the brightness-darkness for two cycles. Consequently, if the change in the light amount of the brightness-darkness is detected at this juncture, it is possible to obtain the rotational amount of the scale 105a.

FIG. 1B is a view schematically showing the principal part of a portion of a conventional rotary encoder of the diffracted light interference type capable of detecting not only the rotational amount of the scale 105a but also the rotating directions thereof.

In FIG. 1B, as compared with the rotary encoder shown in FIG. 1A, there are prepared at least two kinds of brightness-darkness signals obtainable from the two diffracted lights accompanied with the rotation of the scale 105a, and the rotating direction of the scale 105a is detected by shifting the timing of brightness-darkness thereof from each other.

In other words, according to FIG. 1B, before the n-th diffracted light and the m-th diffracted light emitted from the minute grating array 105 are superposed, both of them are made into luminous fluxes linearly polarized, whose polarized wave surfaces are orthogonal to each other, by utilizing polarization plates 108a and 108b. Then, after the optical paths are superposed through mirrors 109a, 109b and a beam splitter 103a, the luminous fluxes pass through a ¼ wavelength plate 107a, and thus are transformed into the linearly polarized waves in which the orientation of the polarized wave surface is determined up to the phase difference between the two luminous fluxes.

Further, these waves are divided into two luminous fluxes by a non-polarized beam splitter 103b. Each of the luminous fluxes is transmitted through each of the polarization plates (analyzers) 108c and 108d which are arranged so as to shift the detection orientations (the orientations of the transmittable linearly polarized light) of the luminous fluxes from each other. Hence, the two kinds of brightness-darkness signals whose brightness-darkness timing is shifted due to the interference of the two luminous fluxes are detected by the detectors 110a and 110b.

If, for example, the detection orientations of these two polarization plates are deviated 45° from each other, the brightness-darkness timing is shifted 90° (π/2) in terms of phase. At this juncture, the rotary encoder shown in FIG. 1B detects the rotational information including the rotating direction of the scale 105a using the signals from the two detectors 110a and 110b.

Now, such a rotary encoder obtains interfering signals by interfering the diffracted light once diffracted by the diffraction grating, and then obtains rotational information by detecting such signals. In order to enhance the detection resolution, however, it is desirable to allow diffracted light to be diffracted twice to interfere with each other. Also, in order to avoid any influence or the like from the eccentricity of a scale, it is desirable to perform this two-time diffraction at points as far apart as possible (optimally, at two points substantially point symmetrical with respect to the rotational center).

SUMMARY OF THE INVENTION

It is a first object of the present invention to provide an apparatus with a simpler structure for measuring rotational information in such a manner that two luminous fluxes diffracted twice at two different points are superposed and detected.

It is a second object of the present invention to provide an apparatus wherein the light guide optical system is simply structured in order to guide the two luminous fluxes diffracted on a first point on the diffraction grating to a second point on the diffraction grating particularly, whereby the optical construction in the vicinity of the diffraction grating can be structured more simply in particular.

The above-mentioned and other objects, features and advantages of the present invention will become more apparent by reference to the detailed description of the invention set forth below.

BRIEF DESCRIPTION OF THE DRAWINGS

FIG. 3A is a view for explaining the deviation and correction of an optical path when error is present in mounting a disc unit shown in FIG. 2.

DETAILED DESCRIPTION OF THE PREFERRED EMBODIMENTS

A rotary encoder according to an embodiment set forth below is characterized in that a luminous flux from a light source enters a point P1 on a minute grating on a disc which is rotating and then two diffracted lights of given orders from the point P1 are guided by light guiding means so as to deviate optical paths from each other thereby to enter a point P2 which is substantially symmetrical to the point P1 on the minute grating, that the two lights diffracted at the point P2 are superposed by superposing means to interfere with each other and are then allowed to enter light receiving means, and that the rotational information of the disc is detected by utilizing the interference signals thus obtained by the light receiving means.

A rotary encoder according to another embodiment of the present invention is characterized in that the light guiding means comprises one spherical lens group and two cylindrical lens groups, and the two diffracted lights of given orders diffracted at the point P1 respectively pass through the areas symmetrical to the optical axis of the spherical lens group.

A rotary encoder according to still another embodiment of the present invention is characterized in that a luminous flux from a light source enters the minute grating on a disc which is rotating through beam splitting means and then the two diffracted lights of given orders from the minute grating are drawn through the beam splitting means and superposed by superposing means to interfere with each other thereby to enter light receiving means, that the beam splitting means is provided with areas to enable the incident luminous flux to be locally reflected and transmitted, and that when the rotational information of the disc is detected by utilizing the interference signals obtainable from the light receiving means, the luminous flux incident on the minute grating and the diffracted light from the minute grating are drawn by utilizing the reflecting and transmitting areas.

Hereinafter, with reference to the accompanying drawings, the description will be made of the embodiments in detail.

Figure 2:
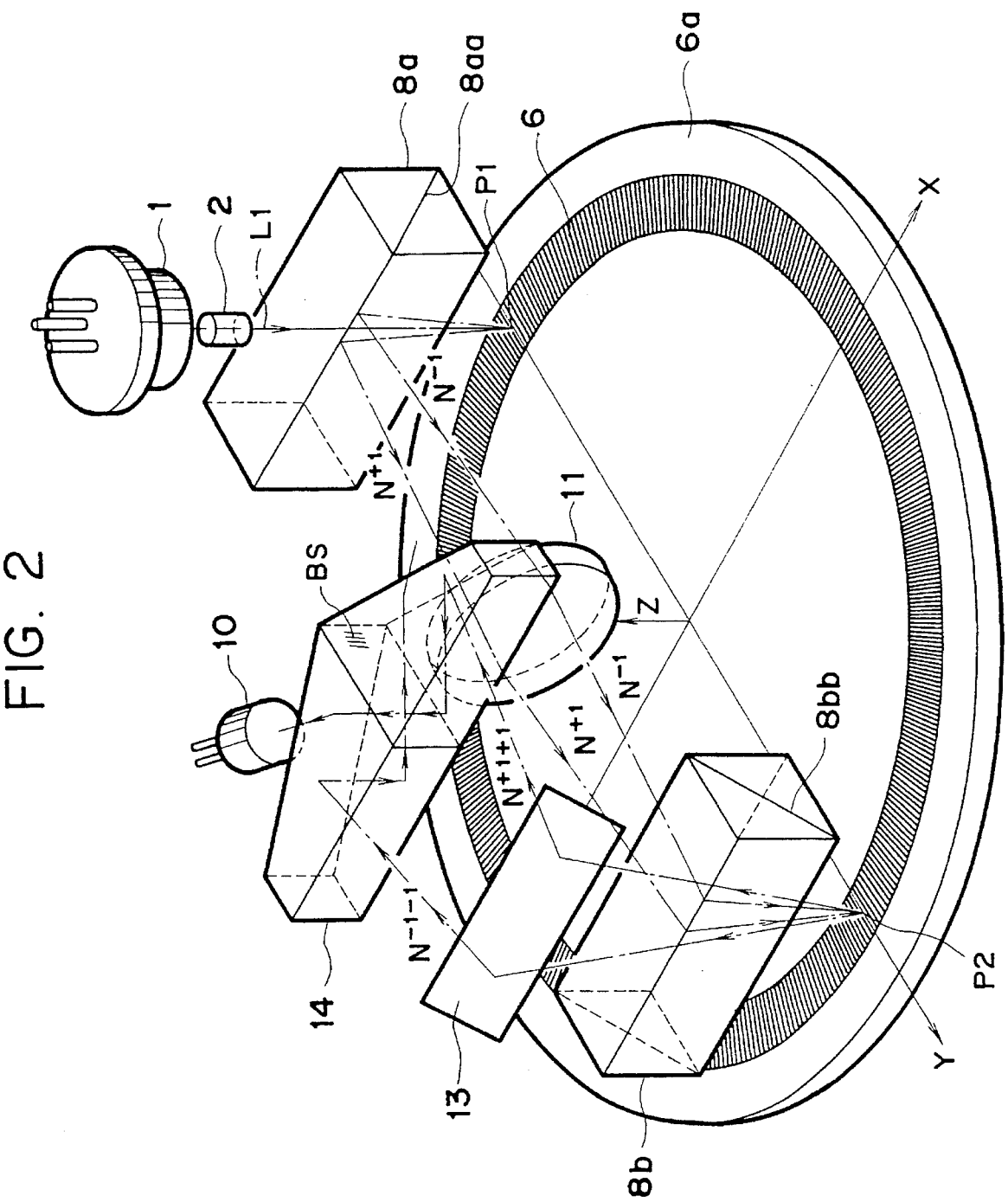
FIG. 2 is a view schematically showing the principal part of the first embodiment of the present invention.

FIG. 2 is a view schematically showing the principal part of the first embodiment according to the present invention. FIG. 2 illustrates a case where each of the elements constituting a rotary encoder is correctly arranged without any error.

In FIG. 2, the diverging luminous flux L1 emitted from a laser 1 serving as light source means is made substantially parallel light by a collimator lens 2, then transmitted through the plane 8aa of a beam splitter 8a to enter vertically a first point P1 on a radial grating array (diffraction grating array) 6 having pitches P of a minute grating on a disc 6a connected to a rotating object (not shown).

Of the diffracted lights reflectively diffracted from the point P1, the + primary diffracted light $N^{+1}$ and the − primary diffracted light $N^{-1}$ are generated along both sides of the optical path of the incident luminous flux, and enter again the beam splitter 8a, then are reflected at the inner plane 8aa of the beam splitter 8a. The optical paths for the two luminous fluxes $N^{+1}$ and $N^{-1}$ are symmetrical to each other with respect to plane Y-Z.

Then, the two lights are transmitted and refracted at a lens 11 constituting light guiding means arranged to allow its major axis (optical axis) on the plane Y-Z so that the optical paths are bent at positions symmetrical to each other with respect to the optical axis of the lens 11, thus entering a beam splitter 8b to be reflected respectively by the inner plane 8bb of the beam splitter 8b to enter a second point P2 (aslant) on the radial grating array 6 on the disc 6a.

Of the reflectively diffracted lights from the point P2, the + primary diffracted light $N^{+1+1}$ of + primary diffracted light and the − primary diffracted light $N^{-1-1}$ of − primary diffracted light are emitted to the outer sides of the opposite incident optical paths, respectively. Therefore, after reflected by a reflective plane 13 to bend the optical paths, these lights enter a Kösters' prism 14 which serves as superposing means so as to superpose the optical paths of the two luminous fluxes on the inner splitting plane BS, thus allowing the luminous fluxes to interfere with each other to be converted into brightness-darkness signal beams to enter a photoelectric element 10 which serves as light receiving means. Thus, brightness-darkness signal on the basis of the rotation of the disc 6a is obtained by the photoelectric element 10 to calculate the rotational information of the disc 6a in accordance with the foregoing equation.

As described above, the + primary diffracted light (−x side) and the − primary diffracted light (+x side) each diffracted to the sides opposite to each other at the point P1 are incident on the point P2 from the −x side for the + primary diffracted light, and from the +x side for − primary diffracted light as they are. Consequently, it is possible to arrange the light guide optical system from the point 1 to the point 2 in the simplest possible structure (because, there is no need for crossing the optical paths on the way, for example.)

In the present embodiment, the disc 6a and the radial grating 6 constitute a disc unit while light source means 1, the lens 2, the beam splitters 8a and 8b, the light guiding means 11 the reflective plane 13, the superposing means 14, and the light receiving means 10 constitute a detection unit, which are provided integrally in a housing (not shown).

FIG. 3A explains a deviation of optical paths in which the disc unit is instantaneously inclined with respect to the rotational center of axis x when the rotating shaft of the disc unit and the central axis of the radial grating array 6 are inclined as compared with the arrangement of FIG. 2 and they are mounted.

The diffraction grating array at the first point P1 is inclined. The emitting orientations of the + primary diffracted light $N^{+1}$ and the − primary diffracted light $N^{-1}$ drawn from the grating array are shifted toward the outside as indicated by dotted lines, as compared with the regular case. Then, after reflected by the inner reflective plane 8aa of the beam splitter 8, the lights enter the lower side (negative orientation of the axis z) portion of the main axis of the lens 11, and are refracted, thus bending the optical paths. Thereafter, the lights are reflected by the inner reflective plane 8bb of the beam splitter 8b, respectively, then are bent to enter the second point P2. (This point is firm even when there is an inclination with the axis x of the disc as the center of rotation.)

Since the surface of the disc unit is also inclined at the second point P2, the + primary diffracted light $N^{+1+1}$ of the +first diffracted light and the − primary diffracted light $N^{-1-1}$ of the − primary diffracted light emitted therefrom are advanced in the orientations which are shifted from the regular optical paths, as indicated by dotted lines. At this juncture, the two luminous fluxes $N^{+1+1}$ and $N^{-1-1}$ are advanced along optical paths symmetrical to each other with respect to the plane Y-Z.

Therefore, no angle difference between the two luminous fluxes will take place when the optical paths are superposed by the splitting plane BS in the Kösters' prism 14, thus the interference patterns are the same as the regular case. Accordingly, the contrast between the interference signal lights never deteriorate. Although the incident positions to the light receiving element 10 are somewhat shifted, there will be no problem if the size of the light receiving surface thereof is large enough against such shift.

Also, since the incident points P1 and P2 for the luminous fluxes are firm on the disc 6a, the shift never degrades the accuracy for reading on the disc 6a.

Figure 3B:
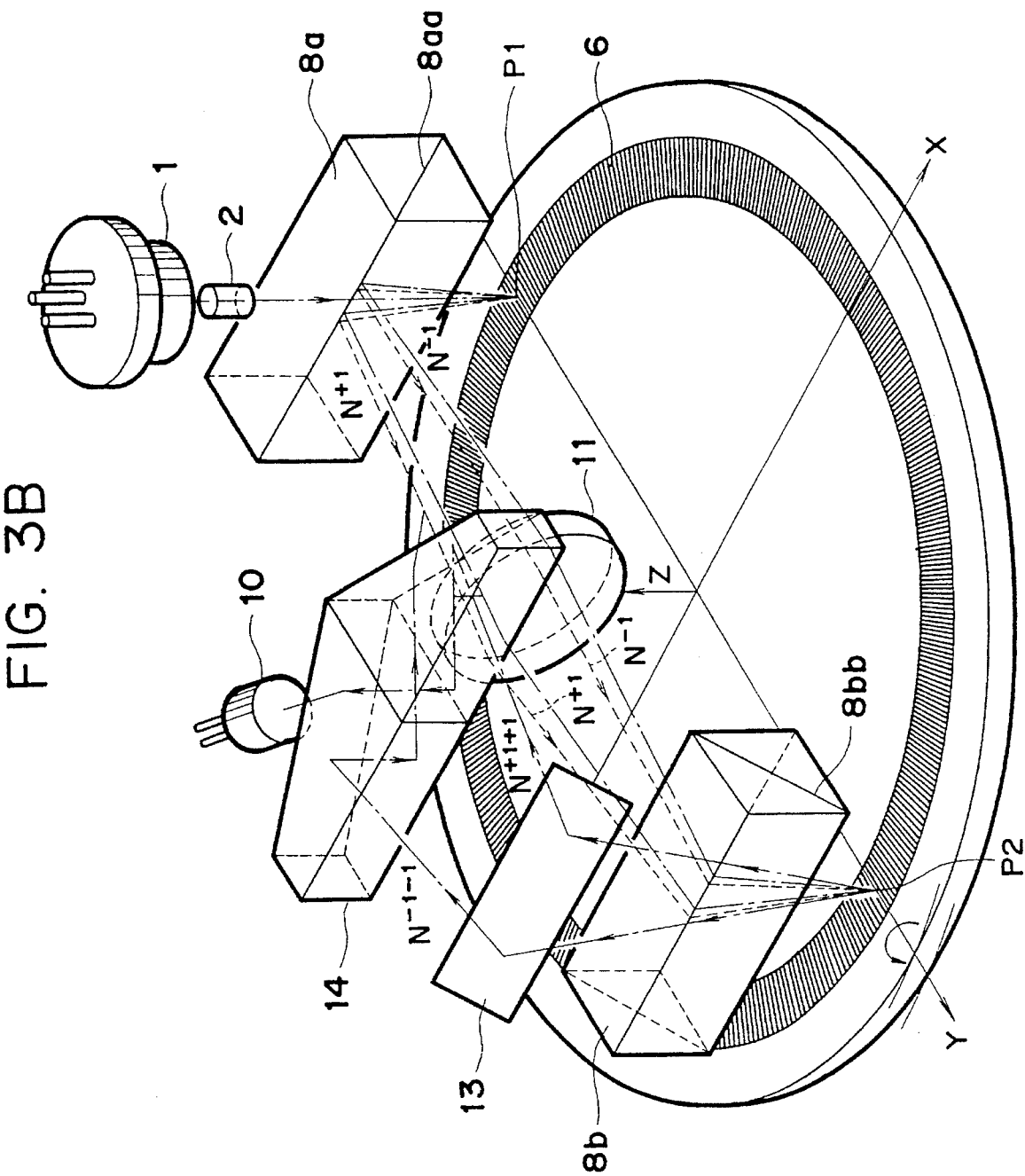
FIG. 3B is a view for explaining the deviation and correction of an optical path when error is present in mounting a disc unit shown in FIG. 2.

FIG. 3B explains a deviation of optical paths in which the disc unit is instantaneously inclined with respect to the rotational center of axis y when the rotating shaft of the disc unit and the central axis of the radial grating array 6 are inclined as compared with the arrangement of FIG. 2 and they are mounted.

The diffraction grating array 6 at the first point P1 is inclined. The emitting orientational vectors of the + primary diffracted light $N^{+1}$ and the − primary diffracted light $N^{-1}$ drawn from the grating array 6 are shifted as indicated by dotted lines. The signs of the shifting components on the axis x are opposed to each other. Thereafter, they are reflected by the inner reflective plane 8aa of the beam splitter 8a, the + primary diffracted light $N^{+1}$ enters the side farther (positive orientation of the axis x) from the main axis of the lens 11 and is refracted, thus the optical path is bent. The − primary diffracted light $N^{-1}$ enters the side nearer (positive orientation of the axis x) to the main axis of the lens 11 and is refracted, thus the optical path is bent. After that, the lights are reflected by the reflective plane 8bb in the beam splitter 8b, respectively, and the optical paths are bent. Hence, the lights enter the second point P2. (This point is firm even when there is an inclination with the axis y of the disc 6 as the center of rotation.)

Also, since the disc unit plane is inclined at the second point P2, the shifted incident angles of the two luminous fluxes and the inclination are cancelled by each other. Thus, the + primary diffracted light $N^{+1+1}$ of the + primary diffracted light and the − primary diffracted light $N^{-1-1}$ of the − primary diffracted light emitted therefrom are advanced in the same orientations as the regular optical paths. As a result, the optical paths thereafter are the same as in the regular case. No degradation of the interference signal patterns and the like will occur. Also, since the incident points P1 and P2 for the luminous fluxes are firm on the disc 6a, this inclination never degrades the accuracy for reading on the disc.

Figure 4:
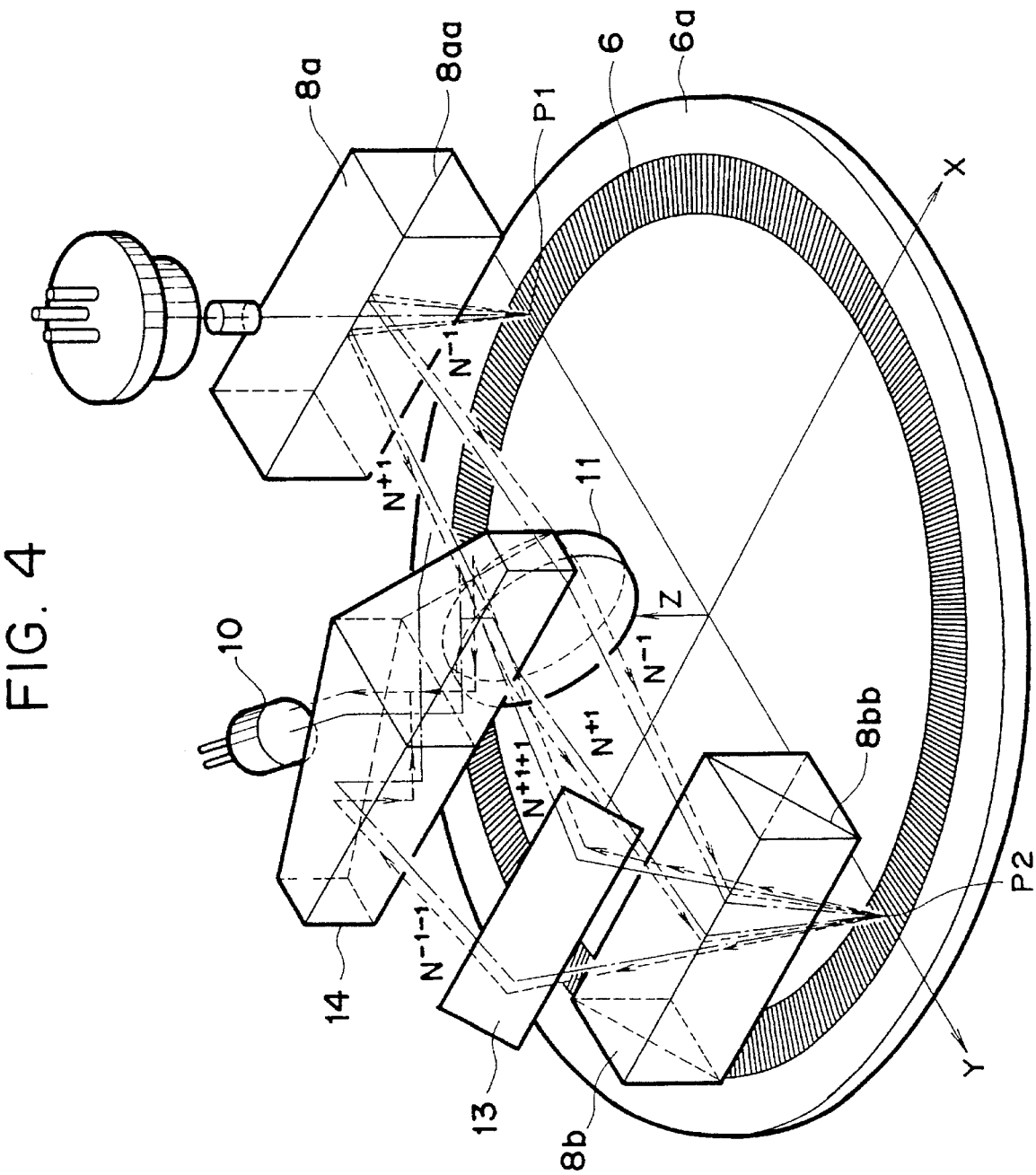
FIG. 4 is a view for explaining the deviation and correction of an optical path when error is present in mounting a disc unit shown in FIG. 2.

FIG. 4 explains a deviation of optical paths when the oscillating wavelengths of a laser 1 are varied, as compared with the arrangement of FIG. 2. Here, a case where the oscillating wavelength of the laser 1 is elongated (rise of temperature) is exemplified for description.

The diffraction angle of the + primary diffracted light $N^{+1}$ and the − primary diffracted light $N^{-1}$ drawn from the first point P1 on the diffraction grating array 6 becomes great, and the optical paths are shifted outward as compared with the regular case. Then, after reflected by the inner reflective plane 8aa of the beam splitter 8a, the ± primary lights $N^{+1}$ and $N^{-1}$ enter the side farther from the main axis of the lens 11 and are refracted, thus the optical paths are bent. Thereafter, the lights enter the second point P2 after reflected by the inner reflective plane 8bb of the beam splitter 8b. (This point is firm even when there is a variation of the oscillating wavelength of the laser 1.)

Since the oscillating wavelength of the laser 1 is also long, the diffraction angle is great at the second point P2. Therefore, the + primary diffracted light $N^{+1+1}$ of the + primary diffracted light and the − primary diffracted light $N^{-1-1}$ of the − primary diffracted light emitted therefrom are advanced in the orientations which are shifted from the regular optical paths, as indicated by dotted lines. At this juncture, the two luminous fluxes are advanced along the optical paths symmetrical to each other with respect to the plane Y-Z.

Therefore, when the optical paths are superposed later by the splitting plane BS of the Kösters' prism 14, no angle difference will take place between the two luminous fluxes. Thus, the interference patterns are the same as the regular case, and the contrast between the interference signal rays of light never deteriorates. Although the incident positions to the light receiving element 10 are somewhat shifted, there will be no problem if the size of the light receiving surface thereof is large enough against such shift. Also, the incident points P1 and P2 for the luminous fluxes are firm on the disc 6a, this shift never degrades the accuracy for reading on the disc.

In the present embodiment, by arranging each of the elements as described above, it is possible to obtain a rotary encoder capable of desirably maintaining the detection accuracy even when there are errors in setting the disc unit and/or fluctuation of the oscillating wavelength of laser, irrespective of the simple structure in which its light guide optical system comprises two mirror surfaces and one lens.

FIG. 5 to FIG. 8 are views schematically and partially showing the principal parts of the second to fifth embodiments of the present invention.

In the second to fifth embodiments, it is arranged to detect two brightness and darkness signal luminous fluxes having different phases in order to detect not only the amount of the rotational angle but also the rotating directions. In FIG. 5 to FIG. 8, the same reference marks are provided for the same elements as those in FIG. 2.

Figure 5:
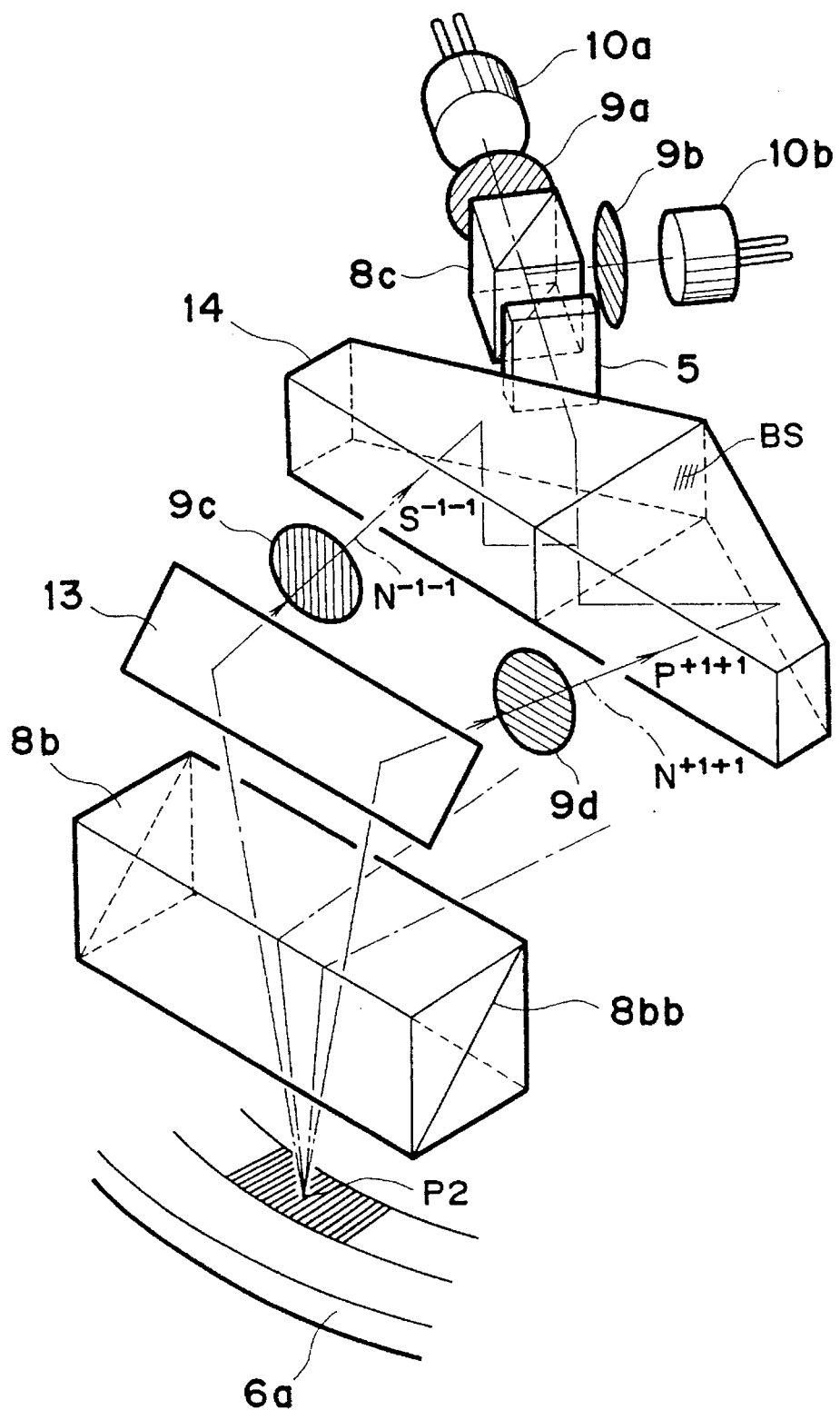
FIG. 5 is a view schematically showing a principal part of the second embodiment of the present invention.

In the second embodiment in FIG. 5, the optical paths of the diffracted light $N^{+1+1}$ and diffracted light $N^{-1-1}$ diffracted at the point P2 are spatially separated from each other between the point P1 and the splitting plane BS in the Kösters' prism 14. Therefore, polarization plates 9c and 9d are inserted into these optical paths and the orientations of the polarization plates are adjusted so as to enable the respective polarization wave surfaces to produce linearly polarized lights orthogonal to each other. Then, subsequent to the superposition of the two luminous fluxes $p^{+1+1}$ and $S^{-1-1}$ by the splitting plane BS of the Kösters' prism 14, these are passed through a ¼ wavelength plate 5 and are converted into a linearly polarized wave in which orientation is determined by polarization wave surface of phase difference between two luminous fluxes. Further, these are split into two by a non-polarization light beam splitter 8c.

Figure 1A:
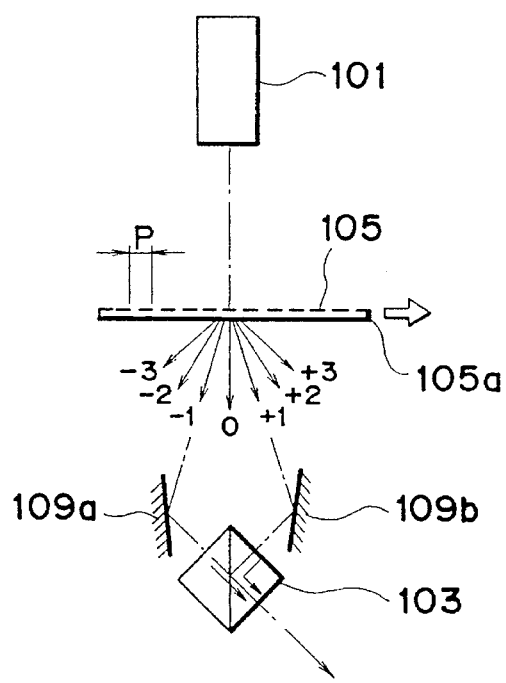
FIG. 1A is a view schematically showing a conventional rotary encoder.
Figure 1B:
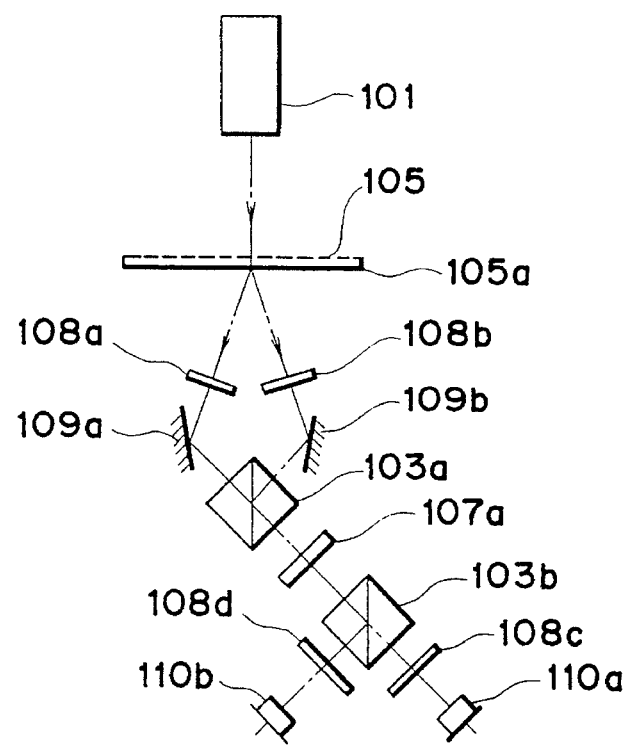
FIG. 1B is a view schematically showing a conventional rotary encoder.

Then, each of the luminous fluxes is passed through the polarization plates 9a and 9b arranged so as to shift the detection orientation (the orientation of the linearly polarized wave which can be transmitted). Thus, when the light receiving elements 10a and 10b receive them, two kinds of brightness-darkness signals are obtained with shifted brightness-darkness timing. All the other structures are the same as the first embodiment shown in FIG. 1. Hence, with the light guide system structured as above, the two-time diffracted lights emitted from the point P2 can be advanced in the optical paths significantly apart from each other, therefore, it is possible to easily provide additional optical elements midway in the respective optical paths to the wave superposing optical system.

Figure 6:
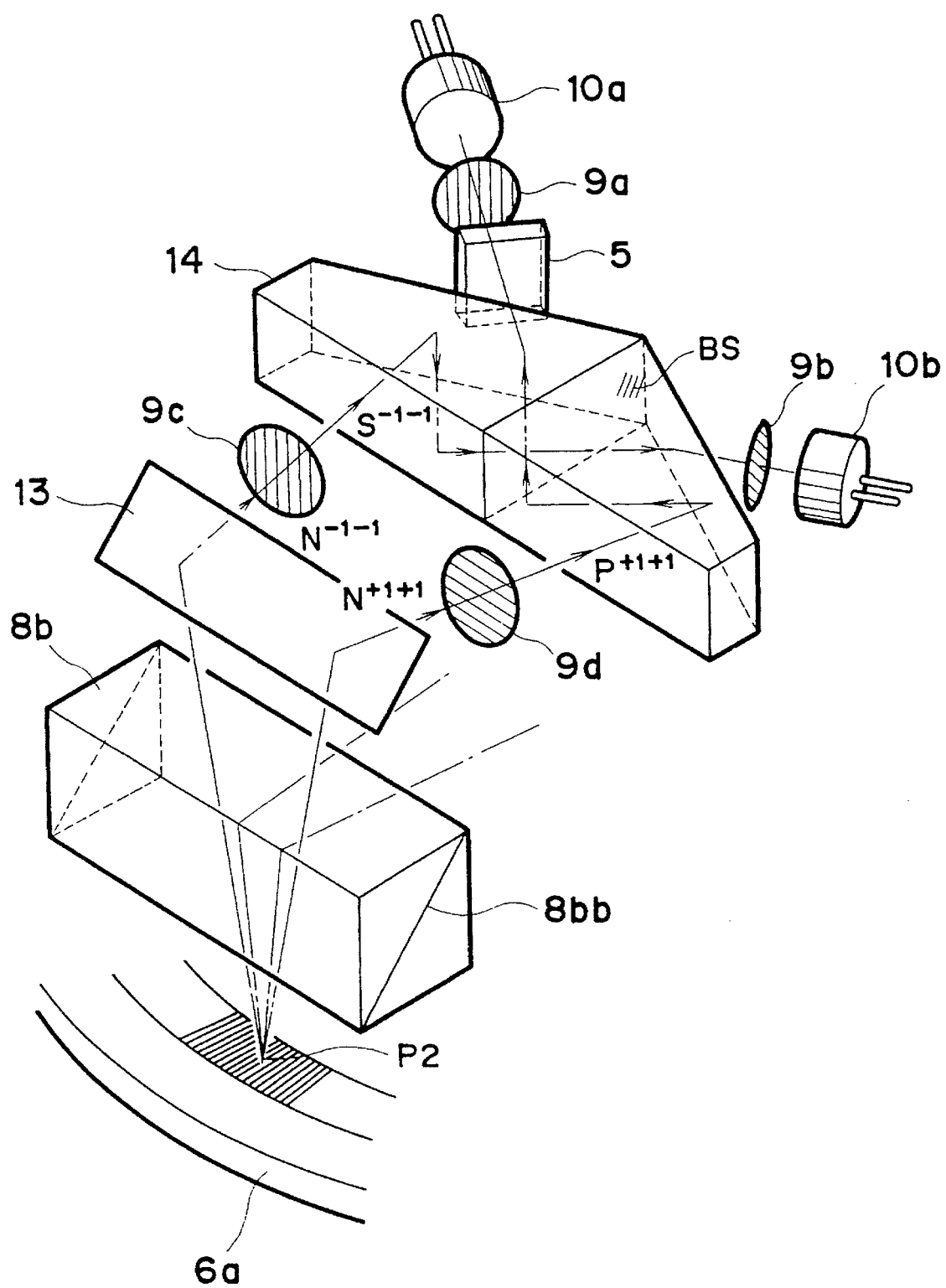
FIG. 6 is a view schematically showing a principal part of the third embodiment of the present invention.

In the third embodiment shown in FIG. 6, the structure is arranged so that the non-polarized light beam splitter 8c is not used, but the other luminous flux obtainable from the Kösters' prism 14 is used. In other words, only the first luminous flux obtained from the splitting plane BS (here, transmitted light) is transmitted through the ¼ wavelength plate 5, then enter a light receiving element 10a after having passed through a polarization plate 9a with the polarization light transmittable characteristic of P polarization orientation or S polarization orientation.

Also, the structure is arranged so that only the second luminous flux (here, reflected light) is transmitted through only a polarization plate 9b having the polarization light transmittable characteristic of 45-degree orientation, and then enter a light receiving element 10b.

The structures mentioned above are what differ from the second embodiment in FIG. 5. Any other structures are the same as the second embodiment.

Figure 7:
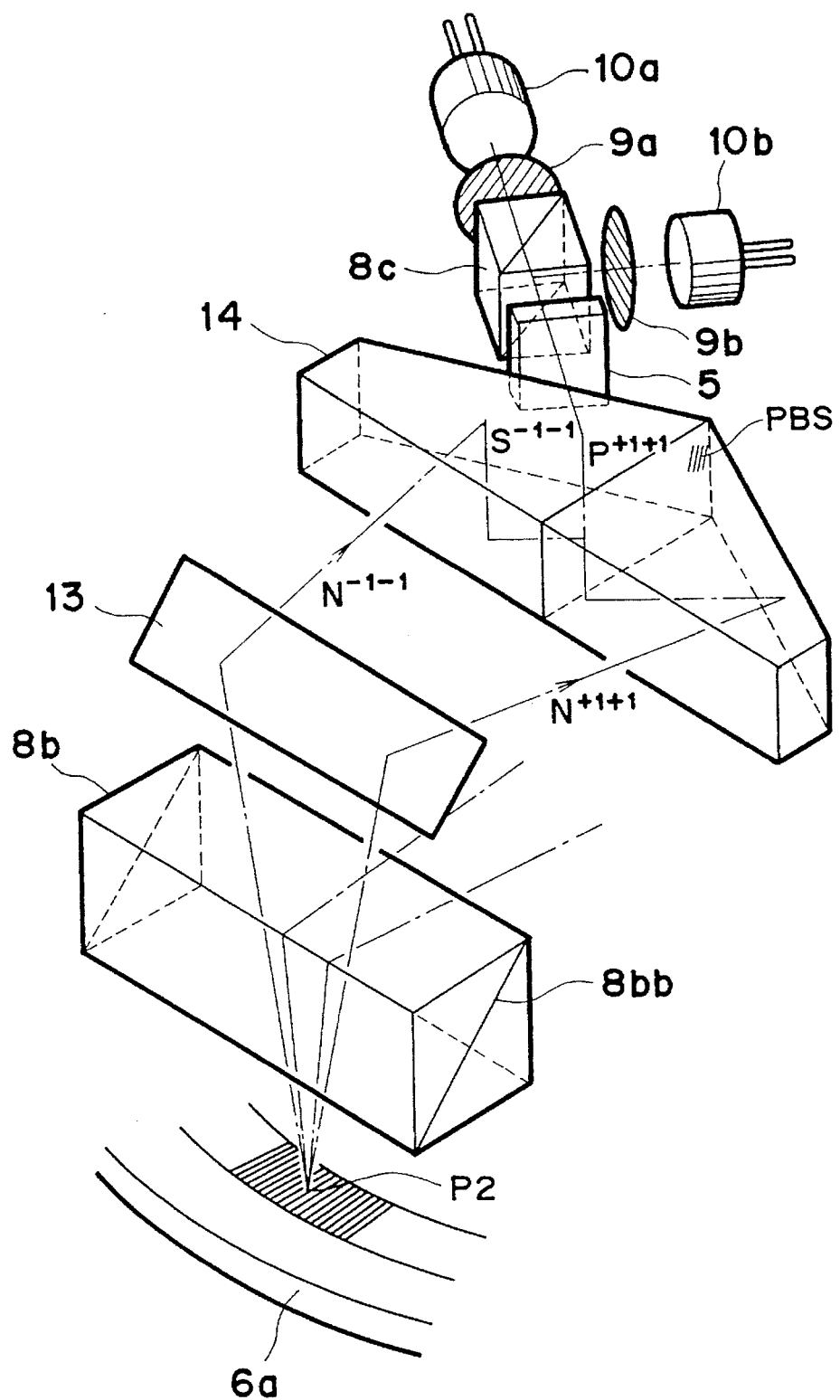
FIG. 7 is a view schematically showing a principal part of the fourth embodiment of the present invention.

The fourth embodiment in FIG. 7 is such that without using the polarization plates 9c and 9d, a polarized light beam splitting film is deposited on the splitting plane BS of the Kösters' prism 14 to allow the polarization orientation of the transmitted light and the polarization orientation of the reflected light to be orthogonal. Then, these are transmitted through the ¼ wavelength plate 5 and divided into two lights by the non-polarized light beam splitter 8c. Further, after passing through the polarization plates 9a and 9b, these lights enter the light receiving elements 10a and 10b, respectively. Hence, two kinds of brightness-darkness signals are obtained with shifted brightness-darkness timing. In other words, two-phase brightness-darkness signals are obtained. This is what differs from the second embodiment shown in FIG. 5. Any other structures are the same as the second embodiment.

Figure 8:
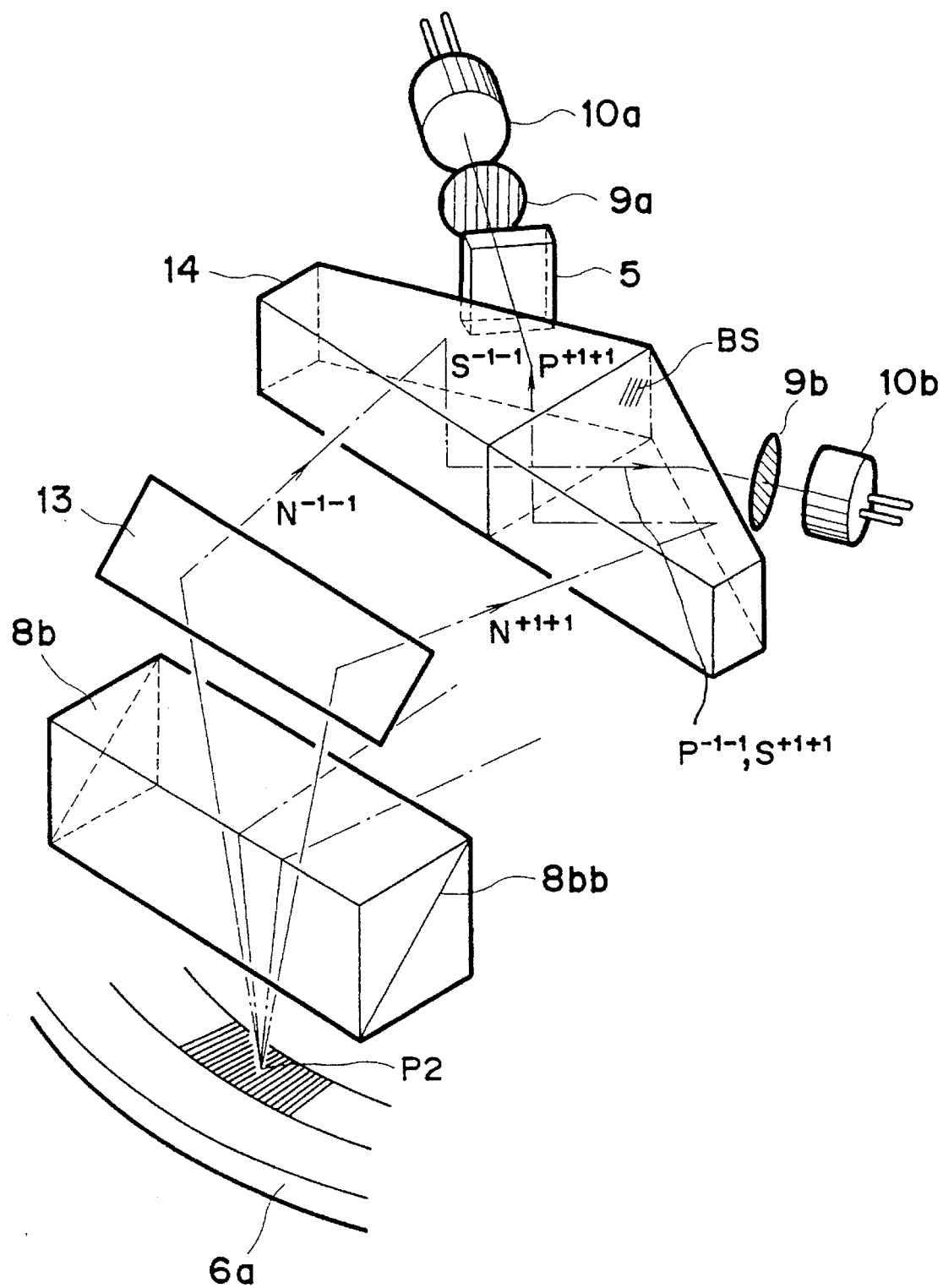
FIG. 8 is a view schematically showing a principal part of the fifth embodiment of the present invention.

The fifth embodiment in FIG. 8 is structured so that only the first luminous flux obtained from the splitting plane BS of the Kösters' prism 14 is transmitted through the ¼ wavelength plate 5, thereafter, this luminous flux enters the light receiving element 10a after being transmitted through the polarization plate 9a having the polarization light transmittable characteristic of P polarization orientation or S polarization orientation, while the second luminous flux is received by the light receiving element 10b after being transmitted through only the polarization plate 9b having the polarized light transmittable characteristic of 45-degree orientation, thus obtaining the two-phase brightness-darkness signal. This is what differs from the fourth embodiment of FIG. 7.

As described above, according to the present invention, it is possible to apply various methods of obtaining the two-phase brightness-darkness signal. For example, as a method of obtaining the two-phase brightness-darkness signal in the present embodiment, it may be possible to combine the methods exemplified in each of the foregoing embodiments appropriately. Also, it may be possible to apply a method of shifting by a specified amount the brightness-darkness timing of the two luminous fluxes obtainable from the Kösters' prism in such a manner that the kind, film thickness and the like concerning the deposition film are appropriately set by utilizing the characteristics of the deposited film on the splitting plane of the Kösters' prism in which the phase of the reflected light and transmitted light therefrom is shifted.

In this case, the ¼ wavelength plate 5, polarization plates 9a, 9b, 9c, and 9d, and non-polarized light beam splitter 8c are not required.

Figure 9:
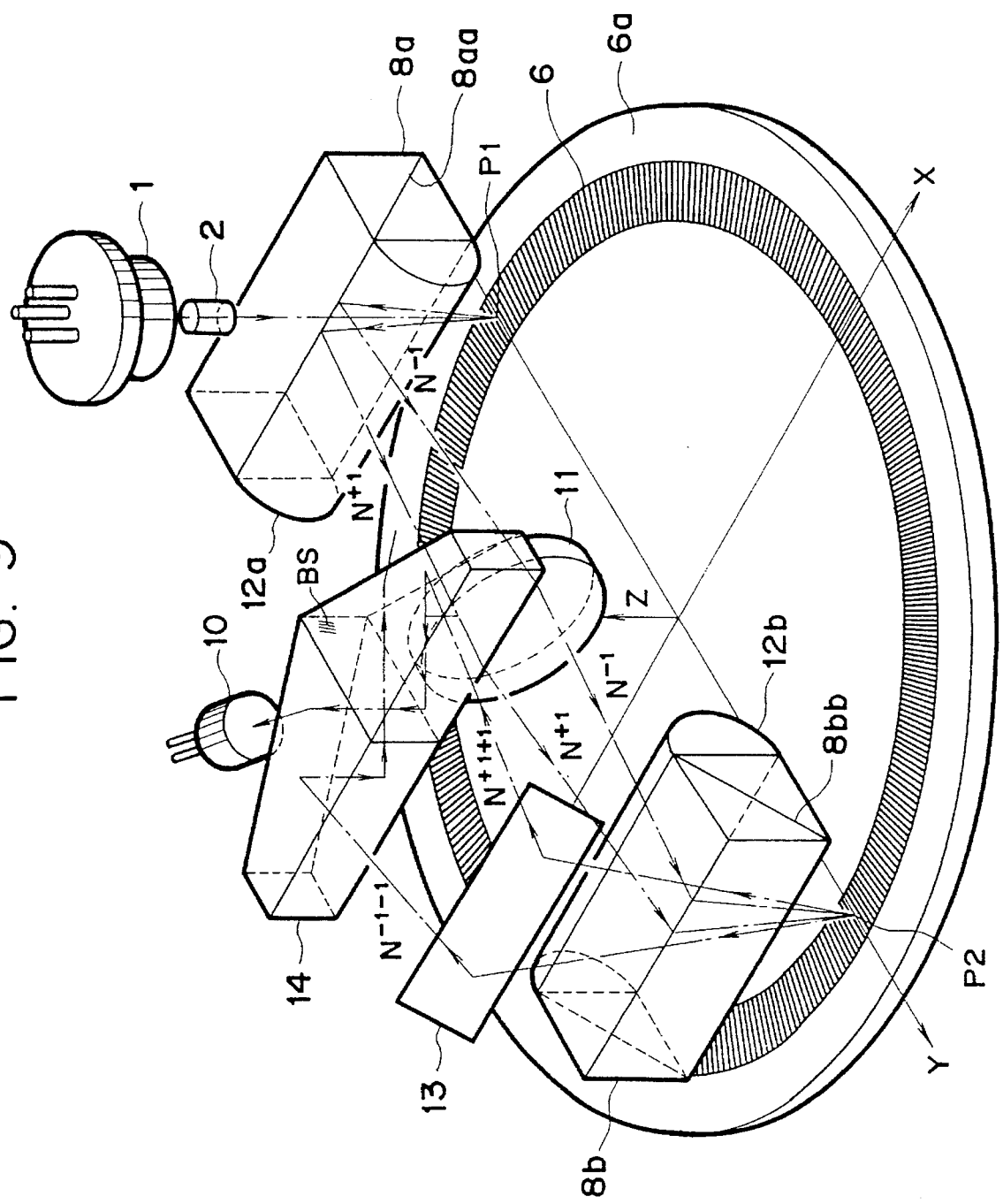
FIG. 9 is a view schematically showing a principal part of the sixth embodiment of the present invention.

FIG. 9 is a view schematically showing the principal part of the sixth embodiment. FIG. 9 illustrates a case where each of the elements constituting a rotary encoder is correctly arranged without any errors.

In FIG. 9, the diverging luminous flux L1 emitted from a laser 1 serving as light source means is made substantially parallel light by a collimator lens 2, and is transmitted through the plane 8aa of a beam splitter 8a to enter vertically a first point P1 on a radial grating array (diffraction grating array) 6 having pitches P of a minute grating on a disc 6a connected to a rotational object (not shown).

Of the diffracted lights reflectively diffracted from this point P1, the + primary diffracted light $N^{+1}$ and the − primary diffracted light $N^{-1}$ are generated along both sides of the incident luminous flux, and enter again the beam splitter 8a then reflected-at the inner plane 8aa of the beam splitter 8a. The optical paths for the two luminous fluxes $N^{+1}$ and $N^{-1}$ are symmetrical to each other with respect to the plane Y-Z.

Then, these lights pass through a cylindrical lens 12a whose generatrix is adjusted in parallel with the axis x. The optical paths are bent when transmitted and refracted at the positions symmetrical to each other with respect to the optical axis of the lens 11 which is composed of the spherical surface arranged to allow its main axis (optical axis) to be on the plane Y-Z. Thus, the lights enter a beam splitter 8b through a cylindrical lens 12b whose generatrix is adjusted in parallel with the axis x, are then reflected by the inner plane 8bb of the beam splitter 8b, respectively, and enter (aslant) a second point P2 on the radial grating array 6 on the disc 6a.

The cylindrical lens 12a, spherical lens 11, and cylindrical lens 12b comprising elements of a light guiding means.

In the present embodiment, the spherical lens group 11 performs mapping of the point P1 onto the point P2 with respect to the tangential components of the disc 6a, by substantially equal times. The two cylindrical lens groups 12a and 12b have refractive power for the radial components of the disc 6a. For the radial components of the disc, the cylindrical lens group 12a images the point P1 once onto the vicinity of the spherical lens group 11, thereafter, the cylindrical lens group 12b reimages through the spherical lens 11 the image of the point P1 onto the point P2.

While the cylindrical lens 12a (12b) is adhesively bonded with the beam splitter 8a (8b), it may be possible to arrange them separately.

Then, of the reflectively diffracted lights from the point P2, the + primary diffracted light $N^{+1+1}$ of + primary diffracted light and the − primary diffracted light $N^{-1-1}$ of − primary diffracted light are emitted to the outer side of the opposite incident paths, respectively. After the lights are reflected by a reflective plane 13 to bend the optical paths, these lights enter a Kösters' prism 14 which serves as superposing means so as to superpose the optical paths of the two luminous fluxes by means of the inner splitting plane BS, thus allowing the luminous fluxes to interfere with each other to be converted into brightness-darkness signal beams to enter an photoelectric element 10 which serves as light receiving means. In this way, the brightness-darkness signal on the basis of the rotation of the disc 6a is obtained by the use of the photoelectric element 10 to calculate the rotational information of the disc 6a in accordance with the foregoing equation. The present embodiment is such that the cylindrical lenses for image formation in the radial direction of the disc are additionally arranged to the embodiment described in FIG. 1. For this reason, the number of elements is increased, but as a structure which requires an optical system for image formation in the radial direction the present embodiment is comparatively simple.

In the present embodiment, also, disc 6a and radial grating array 6 constitutes a disc unit. Light source means 1, lens 2, beam splitters 8a and 8b, light guiding means 11, reflective plane 13, superposing means 14, and light receiving means 10 constitute a detection unit. These constituents are integrally arranged in a housing (not shown).

Figure 10:
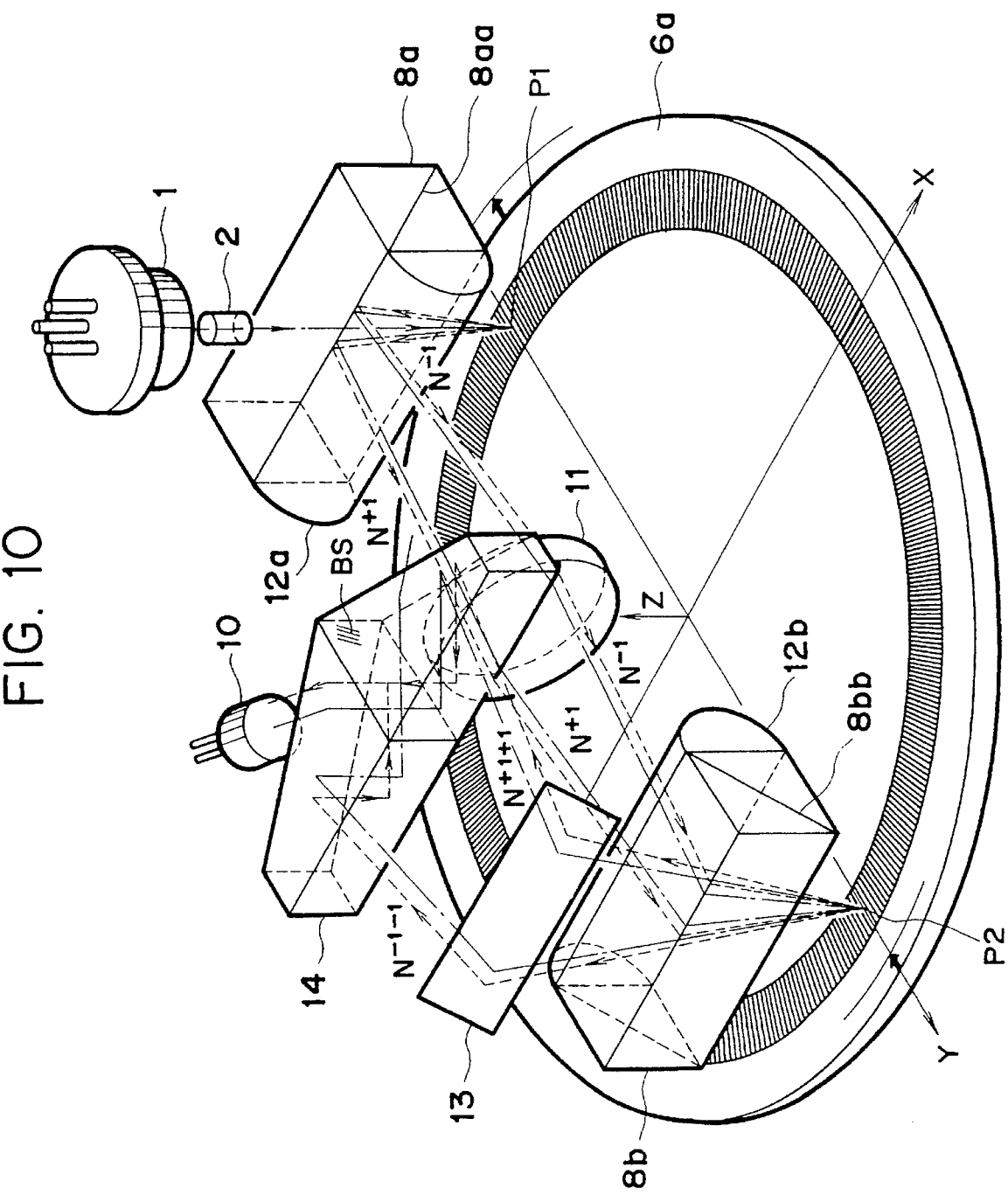
FIG. 10 is a view for explaining the deviation and correction of an optical path when errors are present in mounting a disc unit shown in FIG. 9.

FIG. 10 explains an optical path deviated instantaneously in the negative direction of axis y when the rotational center of the disc unit and the center of the radial grating array 6 are deviated in parallel therewith, as compared with the arrangement of FIG. 9.

The pitch of the diffraction grating array 6 at the first point P1 becomes apparently minute, and the diffraction angle of the + primary diffracted light $N^{+1}$ and the − primary diffracted light $N^{-1}$ drawn therefrom becomes great. Hence, the optical paths are shifted outside as indicated by dotted lines as compared with the regular case.

Thereafter, being reflected by the inner reflective plane 8aa of the beam splitter 8a, these lights are transmitted through the central generatrix (the portion where the normal line vector of the plane is in parallel with the axis y) of the cylindrical plane of the cylindrical lens 12a and then transmitted and refracted through the spherical lens 11 so as to bend the optical paths in the direction of the axis x. These lights further pass through the central generatrix of the cylindrical plane of the cylindrical lens 12b.

Then, being respectively reflected by the inner reflective plane 8bb of the beam splitter 8b to bend the optical paths, these lights enter the second point P2. (This point P2 is firm even with the shifting, or the decentering, of the disc in the direction of axis x.)

The pitch of the diffraction grating array at the second point P2 becomes, apparently, wide. The diffraction angle of the + primary diffracted light $N^{+1+1}$ of the + primary diffracted light and the − primary diffracted light $N^{-1-1}$ of the − primary diffracted light drawn therefrom, becomes small, and the deviated incident angle is added to the diffraction angle, thus the lights return on the optical paths shifted symmetrically to the plane Y-Z from the regular optical paths (where the disc is not shifted in the direction of −y axis).

Therefore, there will be no angle difference generated between the two luminous fluxes when the optical paths of the two luminous fluxes are superposed later in the inner splitting plane BS of the Kösters' prism 14. Therefore, since the interference patterns are the same as the regular case, the contrasts of the interference signal light never deteriorates. Although the incident position to the light receiving element 10 is somewhat shifted, there will be no problem if the light receiving surface is large enough against such shift.

Also, since the incident points P1 and P2 for the luminous fluxes on the disc 6a are firm, this shift will never degrade the accuracy for reading on the disc.

Figure 11:
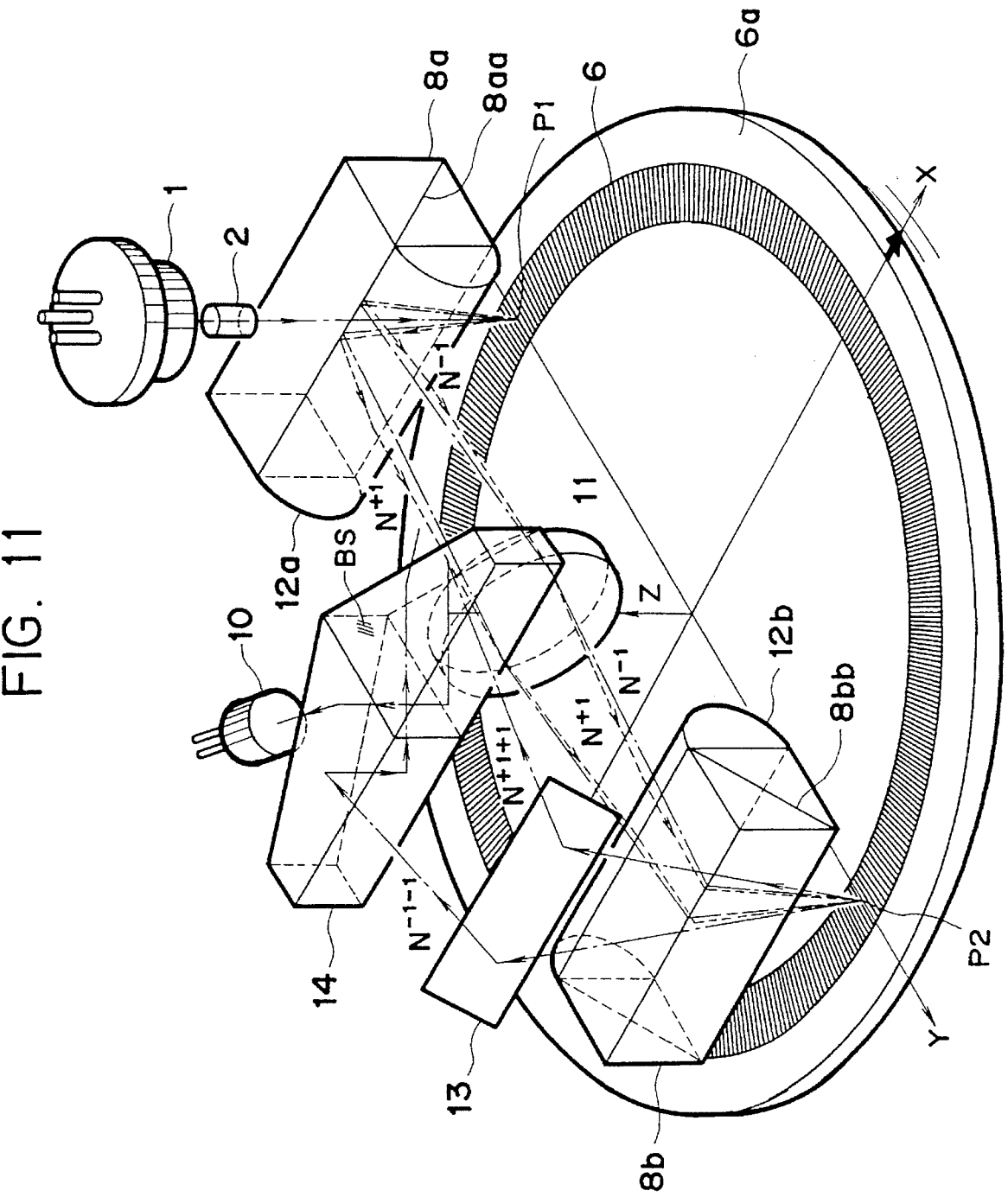
FIG. 11 is a view for explaining the deviation and correction of an optical path when error is present in mounting a disc unit shown in FIG. 9.

FIG. 11 explains an optical path deviated instantaneously in the positive direction of axis x when the rotational center of the disc unit and the center of the radial grating array 6 are deviated in parallel therewith, as compared with the arrangement of FIG. 9.

The arrangement orientation of the diffraction grating array at the first point P1 is rotated left-hand, and then the marks of the y axis components in the emission orientation of the + primary diffracted light $N^{+1}$ and the − primary diffracted light $N^{-1}$ drawn therefrom are shifted opposite to each other as compared with the regular case. Hence, the optical paths are separated as indicated by dotted lines. After that, these lights are reflected by the reflective plane 8aa in the splitter 8a.

The + primary diffracted light $N^{+1}$ is transmitted and refracted through the upper side (positive orientation of the axis z) of the cylindrical plane of the cylindrical lens 12a. Thus, the optical path is bent in the direction of –z axis. The diffracted light is then transmitted and refracted through the spherical lens 11, and the optical path is bent in the direction +x axis. It is further transmitted and refracted through the lower side (negative orientation of the axis z) of the cylindrical plane of the cylindrical lens 12b. The path is thus bent in the direction of +z axis.

The – primary diffracted light $N^{-1}$ is transmitted and refracted through the lower side (negative orientation of the axis z) of the cylindrical plane of the cylindrical lens 12a. Thus, the optical path is bent in the direction of +z axis. The diffracted light is then transmitted and refracted through the spherical lens 11. The optical path is bent in the direction –x axis. It is further transmitted and refracted through the upper side (positive orientation of the axis z) of the cylindrical plane of the cylindrical lens 12b. The path is thus bent in the direction of –z axis.

Thereafter, these lights are reflected by the inner reflective plane 8bb of the beam splitter 8b to bend the optical paths to enter the second point P2. (This point is firm even with the shifting, or the decentering, of the disc in the direction of axis y.)

The arrangement orientation of the diffraction grating array at the second point P2 is rotated right-hand. Therefore, the + primary diffracted light $N^{+1+1}$ and the – primary diffracted light $N^{-1-1}$ drawn therefrom are affected so that the marks of the y axis component concerning these lights are shifted opposite to each other, thus are cancelled by the y axis components of the incident lights to the point P2 and returned on the regular optical paths (that is, a case where the disc is not shifted in the direction of axis x).

Therefore, the optical paths, thereafter, are the same as the regular case and there will be no degradation of interference signal patterns and others. Also, since the incident points P1 and P2 for the luminous fluxes on the disc 6a are firm, there is no cause that will result in lowering the accuracy for reading on the disc.

Figure 12:
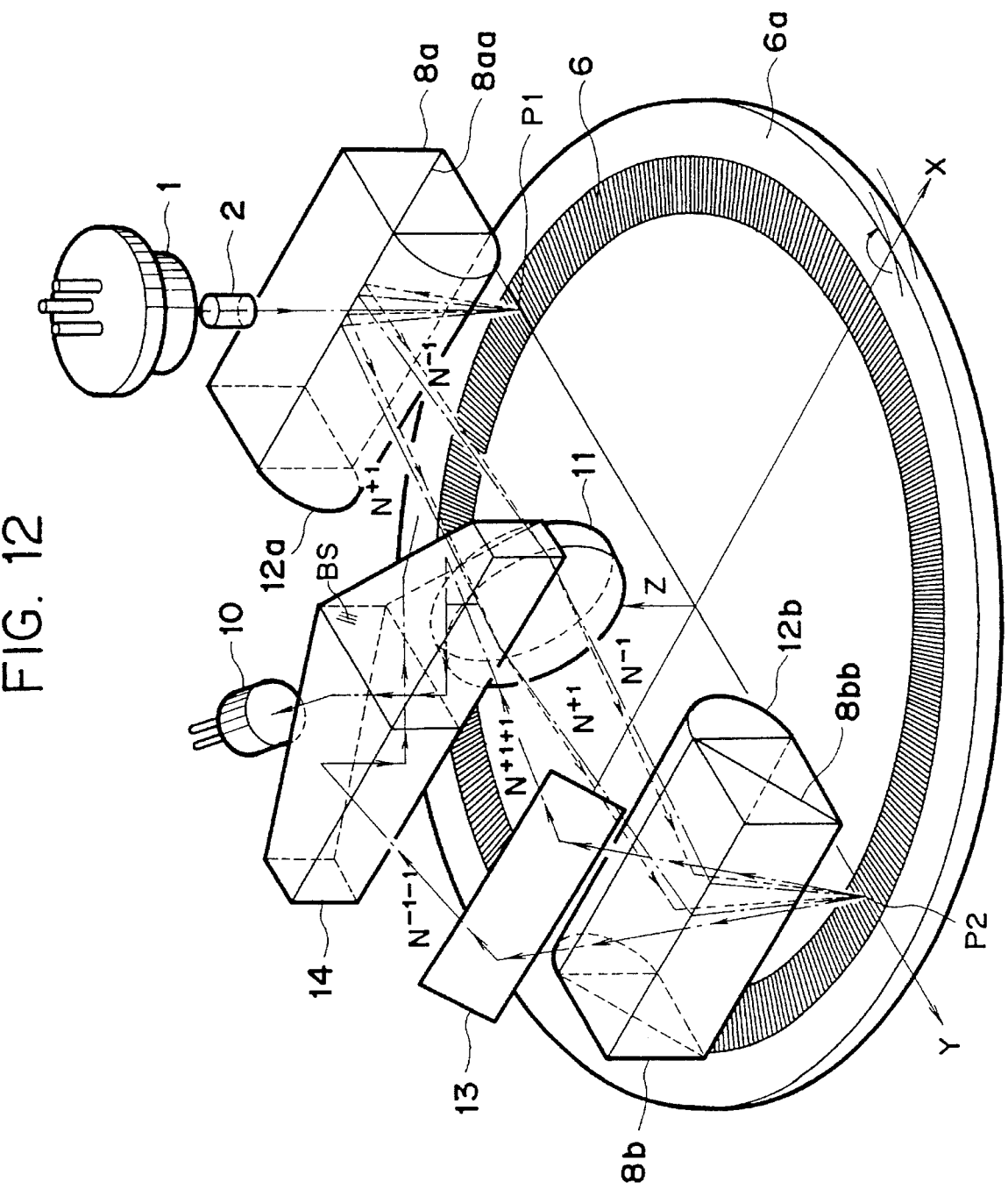
FIG. 12 is a view for explaining the deviation and correction of an optical path when error is present in mounting a disc unit shown in FIG. 9.

FIG. 12 explains a deviation of optical paths in which the disc unit is instantaneously inclined with respect to the rotational center of axis x when the rotating shaft of the disc unit and the central axis of the radial grating array 6 are inclined as compared with the arrangement of FIG. 9 and they are mounted. The first point P1 on the diffraction grating array is inclined. The emission orientations of the + primary diffracted light $N^{+1}$ and the – primary diffracted light $N^{-1}$ drawn therefrom are shifted outward as indicated by dotted lines as compared with the regular case.

Thereafter, these lights are reflected by the inner reflective plane 8aa of the beam splitter 8a to enter the lower side (negative orientation of the axis z) of the main axis of the lens 11 through the cylindrical lens 12a and are reflected. The optical paths are thus bent. Then, these lights are reflected by the reflective plane 8bb of the beam splitter 8b through the cylindrical lens 12b to enter the second point P2 with the optical paths thus bent. (This point is firm even when there is an inclination with the axis x of the disc 6a as the center of rotation.)

Since the disc unit surface is also inclined at the second point P2, the + primary diffracted light $N^{+1+1}$ of the + primary diffracted light and the – primary diffracted light $N^{-1-1}$ of the – primary diffracted light emitted therefrom are advanced in the orientations shifted further from the regular paths as indicated by dotted lines. At this juncture, the two luminous fluxes $N^{+1+1}$ and $N^{-1-1}$ are advanced along the optical paths symmetrical to each other with respect to the plane Y-Z.

Therefore, there will be no angle difference generated between the two luminous fluxes when the optical paths of the two luminous fluxes are superposed later in the inner splitting plane BS of the Kösters' prism 14. Therefore, since the interference patterns are the same as the regular case, the contrast of the interference signal lights never deteriorates. Although the incident position to the light receiving element 10 is somewhat shifted, there will be no problem if the light receiving surface is large enough against such shift.

Also, since the incident points P1 and P2 for the luminous fluxes on the disc 6a are firm, this shift never degrades the accuracy for reading on the disc 6a.

Figure 13:
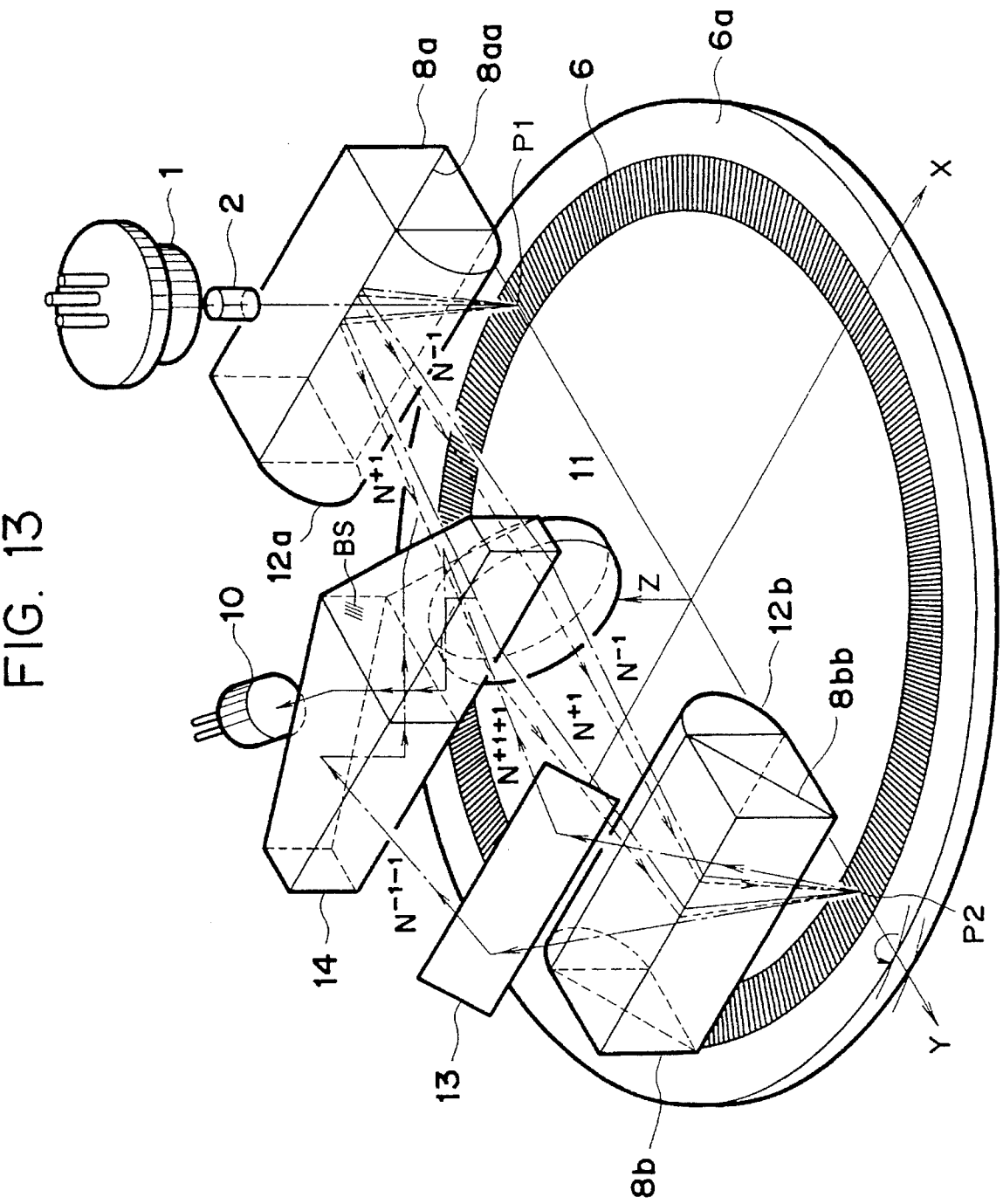
FIG. 13 is a view for explaining the deviation and correction of an optical path when error is present in mounting a disc unit shown in FIG. 9.

FIG. 13 explains a deviation of optical paths in which the disc unit is instantaneously inclined with respect to the rotational center of axis y when the rotating shaft of the disc unit and the central axis of the radial grating array 6 are inclined as compared with the arrangement of FIG. 9 and they are mounted.

The diffraction grating array 6 at the first point P1 is inclined. The emission orientation vector of the + primary diffracted light $N^{+1}$ and the –diffracted light $N^{-1}$ drawn therefrom are shifted as indicated by dotted lines. The signs of the shifted components of the axis x are opposed to each other. Thereafter, the + primary light $N^{+1}$ is reflected by the reflective plane 8aa of the beam splitter 8a to enter the farther side (positive orientation of the axis x) from the main axis of the lens 11 and is refracted through the cylindrical lens 12a). The optical passage is thus bent. Meanwhile, the – primary light $N^{-1}$ enters the side nearer (positive orientation of the axis x) to the main axis of the lens 11 and is refracted. The optical path is also bent.

Then, these lights are respectively reflected by the reflective plane 8bb in the beam splitter 8b through the cylindrical lens 12b to enter the second point P2 with the optical paths thus bent. (This point is firm even when there is an inclination with the axis y of the disc 6a as the center of rotation.)

The disc unit surface is also inclined at the point P2. Therefore, the shifted incident angle of the two luminous fluxes cancel each other. Thus the + primary diffracted light $N^{+1+1}$ of the + primary diffracted light and the – primary diffracted light $N^{-1-1}$ of the – primary diffracted light emitted therefrom are advanced in the same orientation as the regular optical paths. Accordingly, the optical paths, thereafter, are the same as the regular case, and the degradation of the interference signal patterns and others will not occur. Also, the incident points P1 and P2 for the luminous fluxes on the disc are firm. Consequently, this inclination never degrades the accuracy for reading on the disc.

Figure 14:
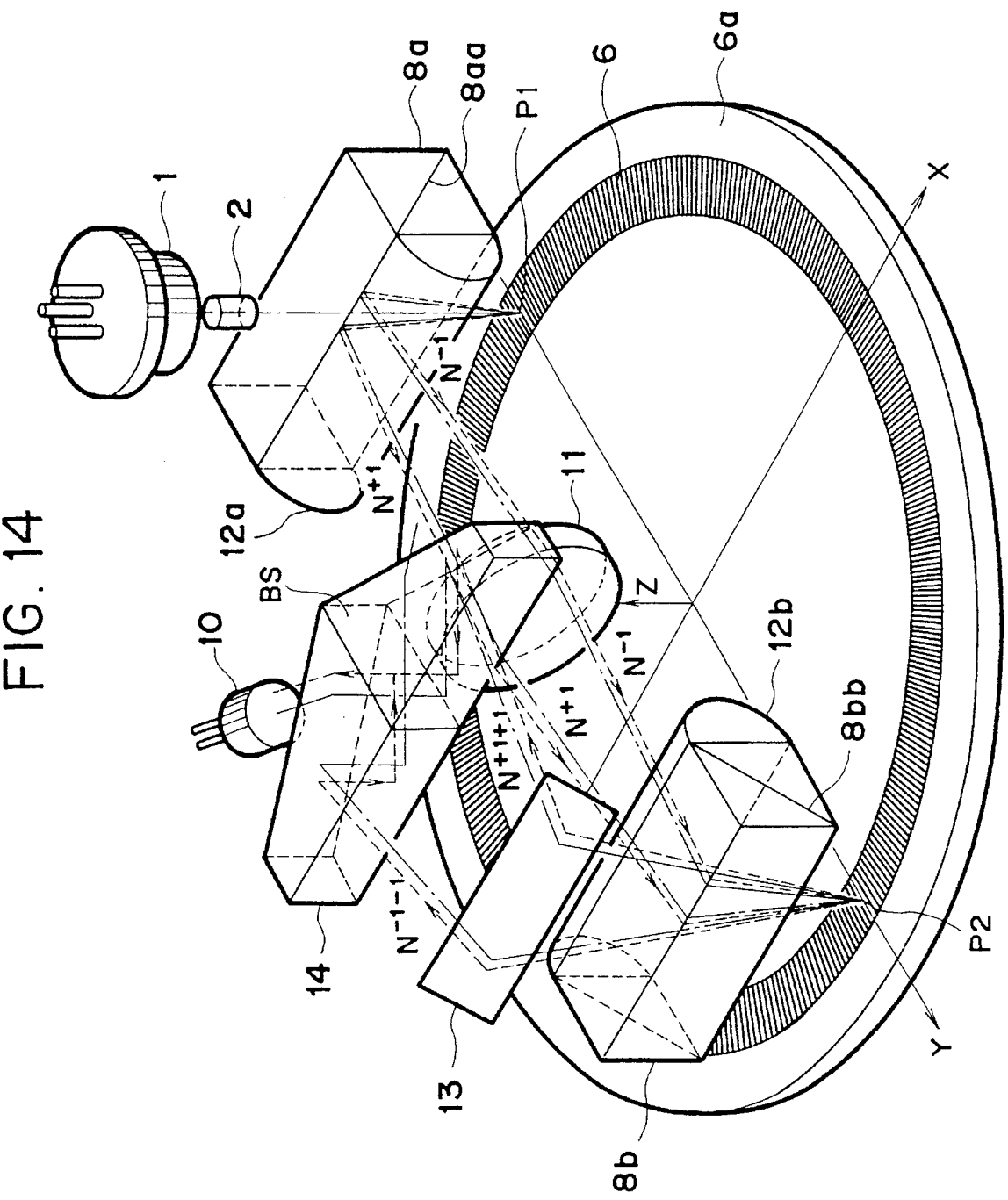
FIG. 14 is a view for explaining the deviation and correction of an optical path when error is present in mounting a disc unit shown in FIG. 9.

FIG. 14 explains a deviation of optical paths when the oscillating wavelengths of a laser 1 are varied, as compared with the arrangement of FIG. 9. Here, the description will be made exemplifying a case where the oscillating wavelength of the laser 1 is elongated (temperature rise).

The diffraction angle of the + primary diffracted light $N^{+1}$ and the – primary diffracted light $N^{-1}$ drawn from the first point P1 on the diffraction grating array 6 becomes great, and the optical paths are shifted outward as compared with the regular case. Subsequently, after reflected by the reflective plane 8aa in the beam splitter 8a, the ± primary diffracted lights $N^{+1}$ and $N^{-1}$ enter the side farther from the main axis of the lens 11 through the cylindrical lens 12a, and are refracted. The optical paths are thus bent.

Thereafter, these lights are respectively reflected by the reflective plane 8bb in the beam splitter 8b through the cylindrical lens 12b to enter the second point P2 with the optical paths thus bent. (This point is firm even when there is any fluctuations of the oscillating wavelength of the laser 1).

Also, at the second point P2, the diffraction angle is great because the oscillating wavelength of the laser 1 is long. The + primary diffracted light $N^{+1+1}$ of the + primary diffracted light and the − primary diffracted light $N^{-1-1}$ of the − primary diffracted light emitted therefrom are advanced in the orientations shifted farther from the regular optical passages as indicated by dotted lines. At this juncture, the two luminous fluxes are advanced on the optical paths symmetrical to each other with respect to the plane Y-Z.

Therefore, there will be no angle difference generated between the two luminous fluxes when the optical paths of the two luminous fluxes are superposed later in the inner splitting plane BS of the Kösters' prism 14. Therefore, the interference patterns are the same as the regular case, the contrasts of the interference signal lights never deteriorates. Although the incident position to the light receiving element 10 is somewhat shifted, there will be no problem if the light receiving surface is large enough against such shift.

Also, since the incident points P1 and P2 for the luminous fluxes on the disc are firm, this shift never degrades the accuracy for reading on the disc.

According to the present embodiment, with each of the elements arranged as described above, it is possible to obtain a rotary encoder capable of desirably maintaining the detection accuracy even when there are errors in setting the disc unit and/or the fluctuations of oscillating wavelength of the laser, in spite of the comparatively simple structure of its light guide optical system.

FIG. 15 to FIG. 18 are schematic views partially showing the principal parts of the seventh to tenth embodiments of the present invention.

The seventh to tenth embodiments are all to detect two brightness-darkness signal luminous fluxes having different phases in order to detect not only the degrees of the rotational angles of the disc, but also the rotational direction thereof. The same reference marks are provided in FIG. 15 to FIG. 18 for the same elements as those in FIG. 9.

Figure 15:
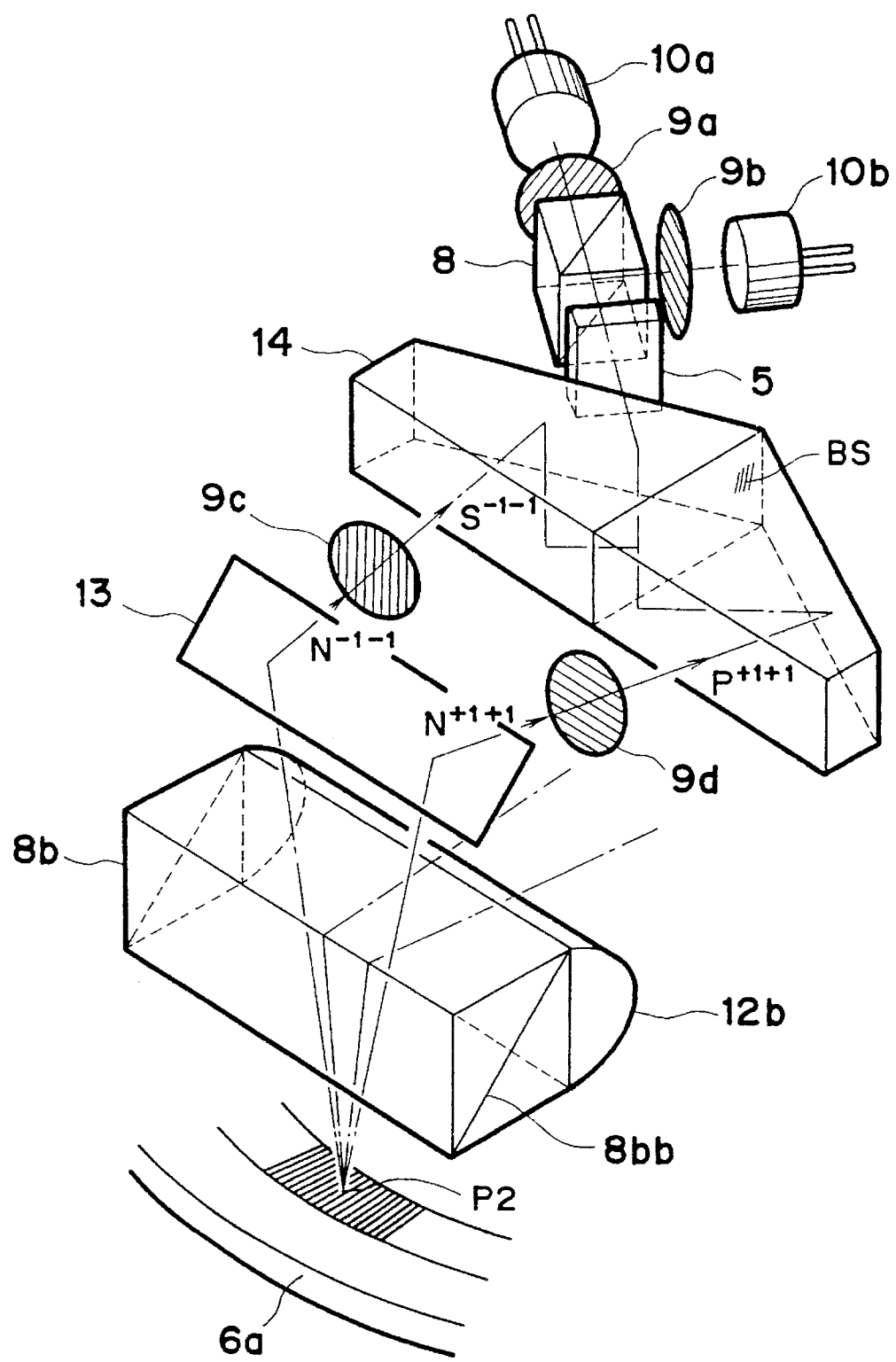
FIG. 15 is a view schematically showing a principal part of the seventh embodiment of the present invention.

In the seventh embodiment shown in FIG. 15, the optical paths of the two diffracted lights $N^{+1+1}$ and $N^{-1-1}$ diffracted at the point P2 are spatially separated from each other between the print P1 and the splitting plans BS in the Kösters' prism 14. Therefore, the polarization plates 9c and 9d are inserted in the optical paths to adjust the orientations of the polarization plates so as to become linearly polarized lights having polarization wave surfaces orthogonal to each other. Then, after superposed on the splitting plane BS of the Kösters' prism 14, the lights p+1+1and $S^{-1-1}$ are transmitted through the ¼ wavelength plate 5 to be converted into "linearly polarized waves in which orientations is determined by polarization wave surface of phase difference between two luminous fluxes". Further, these are split into two by the non-polarization light beam splitter 8c.

Then, each of the luminous fluxes is transmitted through the polarization plates 9a and 9b arranged so as to shift the wave detection orientation (the orientation of the linearly polarized wave which can be transmitted). When the lights are received by the light receiving elements 10a and 10b, two kinds of brightness-darkness signals are obtained with shifted brightness-darkness timing. Any other structures are the same as those of embodiment 6 shown in FIG. 9.

Figure 16:
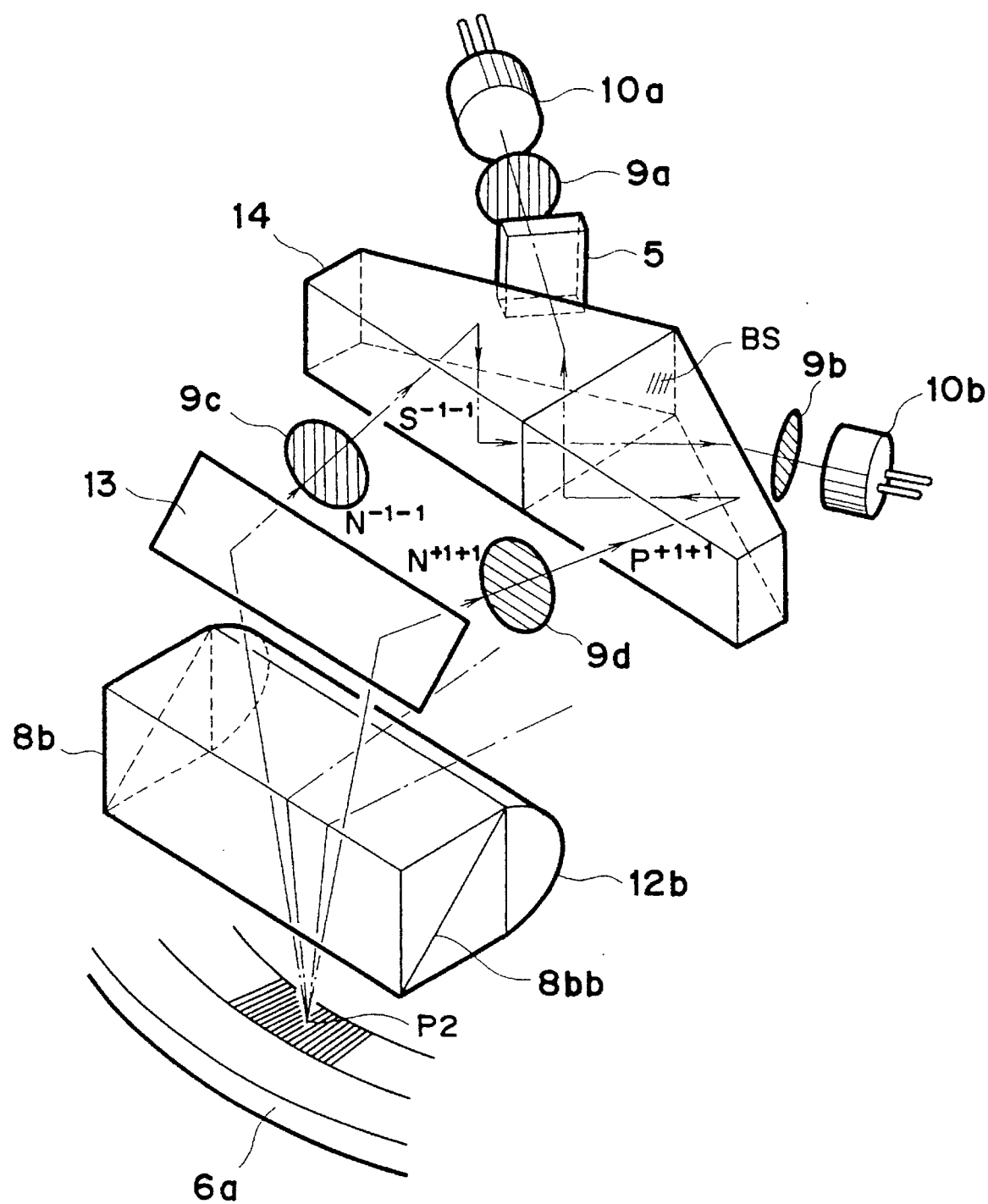
FIG. 16 is a view schematically showing a principal part of the eighth embodiment of the present invention.

In the eighth embodiment shown in FIG. 16, the structure is arranged to utilize the other luminous flux obtainable from the Kösters' prism 14, not to use the non-polarization light beam splitter 8c. In other words, the first luminous flux (here, transmitted light) obtained from the splitting plane BS is transmitted through the ¼ wavelength plate 5, and then enters the light receiving element 10 after being transmitted though the polarization plate 9a having the polarized light transmittable characteristic of the P polarization orientation or S polarization orientation.

Also, the second luminous flux (here, reflected light) is arranged to enter the light receiving element 10b after being transmitted through only the polarization plate 9b having the polarized light transmittable characteristic of 45-degree orientation. These structures are different from the seventh embodiment shown in FIG. 15. Any other structures are the same as embodiment 7.

Figure 17:
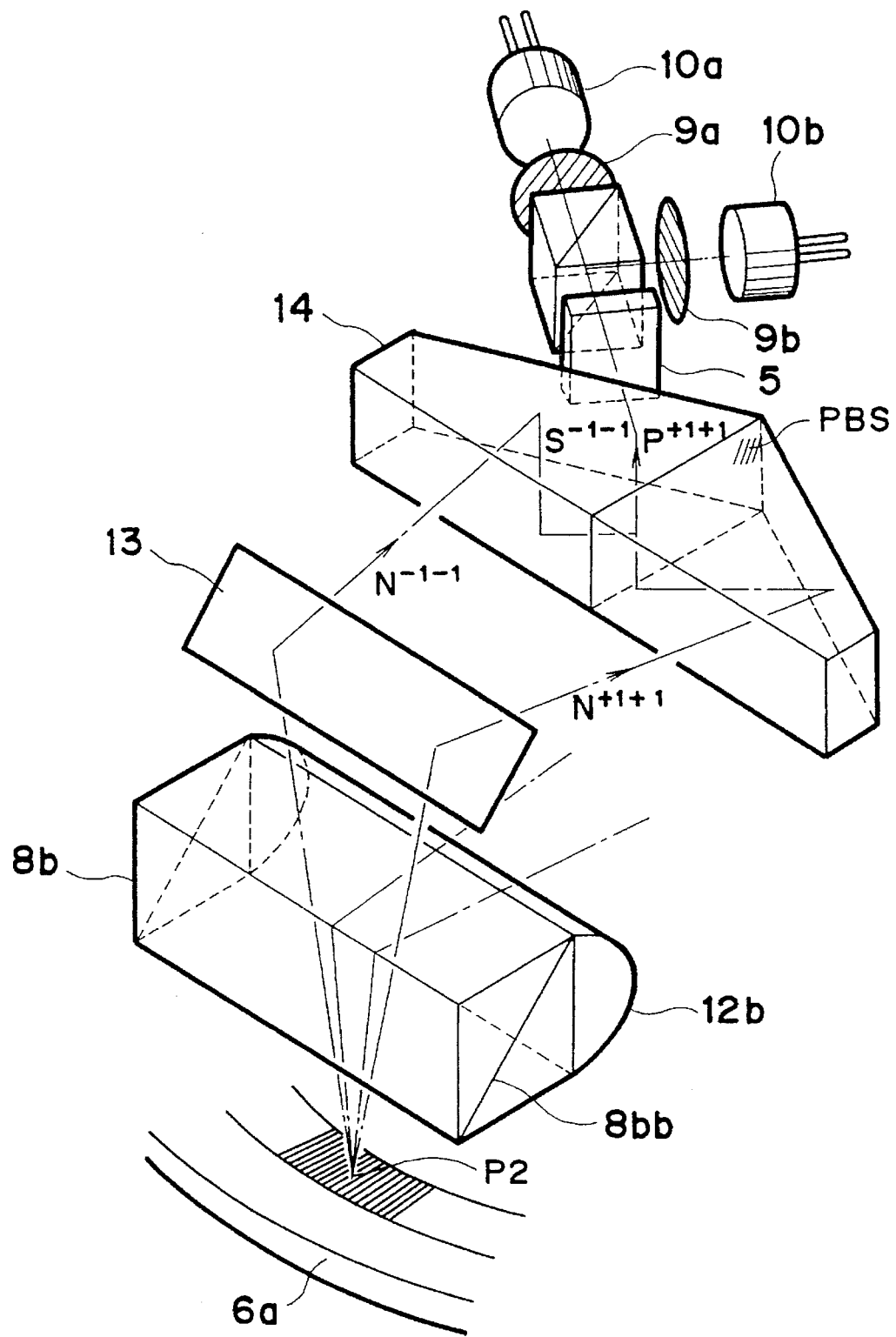
FIG. 17 is a view schematically showing a principal part of the ninth embodiment of the present invention.

In the ninth embodiment shown in FIG. 17, the polarization plates 9c and 9d are not used, but a polarization beam splitting film is deposited on the splitting plane BS of the Kösters' prism 14 to make the polarization orientation of the transmitting light and the polarization orientation of the reflected light orthogonal to each other. After that, these lights are transmitted through the ¼ wavelength plate 5 and are split into two by the non-polarization light splitter 8c. These are then respectively transmitted through the polarization plate 9a and 9b to enter the light receiving elements 10a and 10b, thus obtaining two kinds of brightness-darkness signals with shifted brightness-darkness timing. In other words, two-phase brightness-darkness signals are obtained. This is what differs from the seventh embodiment 7 shown in FIG. 15. Any other structures are the same as the seventh embodiment.

Figure 18:
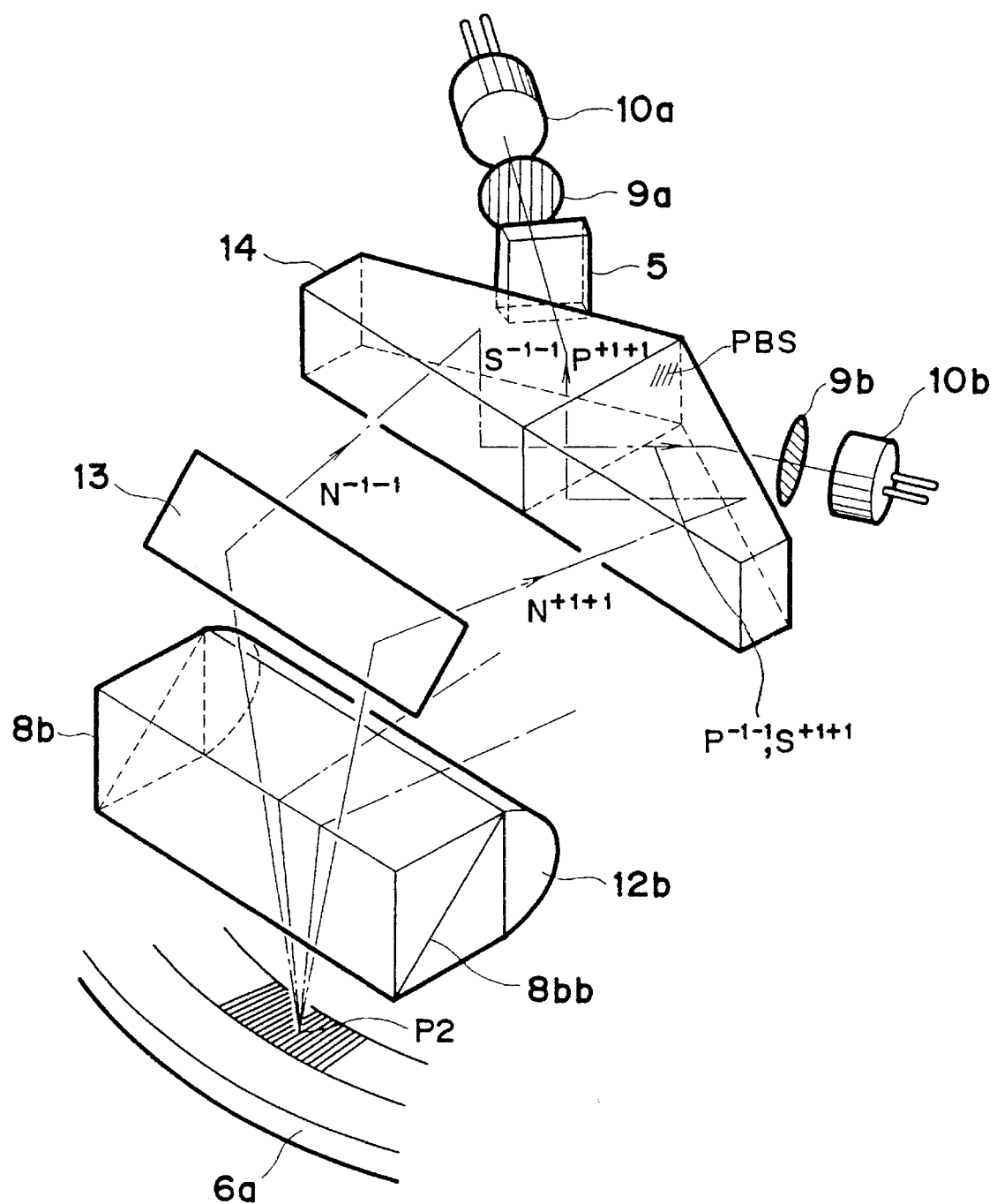
FIG. 18 is a view schematically showing a principal part of the tenth embodiment of the present invention.

The tenth embodiment shown in FIG. 18 is structured so that only the first luminous flux obtained from the splitting plane BS of the Kösters' prism 14 is transmitted through the ¼ wavelength plate 5, then enters the light receiving element 10a after being transmitted through the polarization plate 9a having the polarized light transmittable characteristic of P polarization orientation or S polarization orientation, while the second luminous flux is transmitted through only the polarization plate 9b having the characteristic of 45-degree orientation to enter the light receiving element 10b. Thus, two-phase brightness-darkness signals are obtained. This is what differs from the ninth embodiment of FIG. 17.

When the elements are partially modified as set forth below, the present invention is equally applicable to the first to tenth embodiments described above.

(a) The orders of the diffracted light drawn from the first point and the second point are changed to those other than the ±1.

(b) The lenses 11, 12a, and 12b are divided into plural pieces, are combined or integrally formed so as to have equivalent optical function, or are modified by utilizing a toric plane (whose curvature is different depending on direction). In this case, it is desirable to divide them so as not to make the light guide optical system complicated- Also, these lenses are modified into holographical optical elements having lens function.

(c) The configuration of the Kösters' prism is modified.

(d) The beam splitters 8a and 8b are replaced with flat reflective members (such as glass plates on which half mirror film is deposited).

(e) The films in the beam splitters 8a and 8b are replaced with polarized light beam splitting films in combination with additional crystalline optical elements such as a ¼ wavelength plate to switch over "transmission" and "reflection" in the beam splitters 8a and 8b to convert the polarization states of the luminous fluxes, thus eliminating any loss of the luminous energy.

Figure 19:
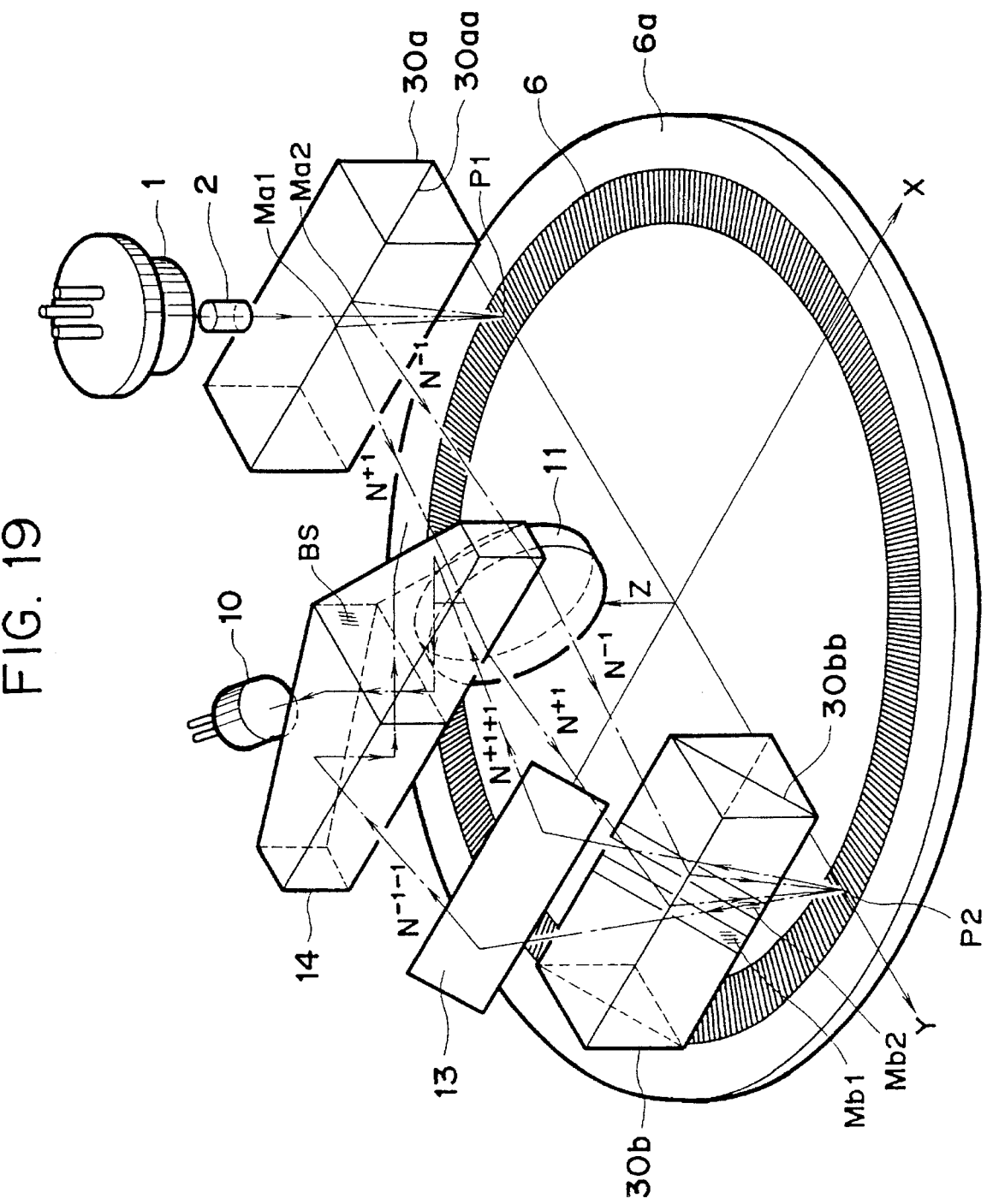
FIG. 19 is a view schematically showing a principal part of the eleventh embodiment of the present invention.

FIG. 19 is a view schematically showing the eleventh embodiment of the present invention.

The present embodiment differs from the first embodiment in FIG. 2 in that luminous flux is separated by means of luminous flux separating means having reflective surface and transmittable surface in area-wise, instead of the beam splitters. Any other structures are substantially the same. The same reference marks are provided in FIG. 19 for the same elements as those in FIG. 2.

In the present embodiment, the laser light is separated by the light flux separating means 30a and 30b whose surfaces 30aa, 30bb are made by striped reflective surfaces and transmittable surface. This is what differs from the beam splitters 8a and 8b shown in FIG. 2.

Now, the structure of the present embodiment will be described although partly repeated from the first embodiment shown in FIG. 2.

The diverging luminous flux emitted from the laser 1 is made into substantially parallel luminous fluxes by the collimator lens 2 to enter luminous flux separating means 30a having locally the reflective surface and transmittable surface (area-wise), and are transmitted through the transmittable surface between the reflective films $Ma_1$ and $Ma_2$ in the luminous flux separating means 30a to enter the first point P1 on the radial grating array 6 on the disc 6a.

Of the reflectively diffracted lights from this point P1, the + primary diffracted light $N^{+1}$ and the − primary diffracted light $N^{-1}$ are generated on both sides of the optical paths of the incident luminous fluxes to enter again the luminous flux separating means 30b (the same structure as 30a) and are reflected by the reflective plane provided with the reflective film ($Ma_1$, not shown) ($Ma_2$, not shown) (the diffracted lights other than these are all transmitted).

The optical paths of the two luminous fluxes N+1 and $N^{-1}$ reflected by the reflective plane are symmetrical to each other with respect to the plane Y-Z, and are transmitted and refracted at the positions symmetrical to each other with respect to the optical axis of the lens 11 arranged so as to place the main axis (optical axis) on the planes Y-Z. Thus, the optical paths are bent to allow the lights to enter luminous flux separating means 30b, and the lights are respectively reflected by the reflective planes provided with the reflective films $Mb_1$ and $Mb_2$ therein to enter (aslant) the second point P2 on the radial grating array 6 on the disc 6a.

Of the reflectively diffracted lights from this point P2, the + primary diffracted light $N^{+1+1}$ and the − primary diffracted light $N^{-1-1}$ are generated on both sides of the optical paths of the incident luminous fluxes to transmit the transmittable surfaces outside the reflective films $Mb_1$ and $Mb_2$ of the luminous flux separating means 30b. The optical paths are thus bent when reflected by the reflective planes 13. In the Kösters' prism 14, the optical paths of the two luminous fluxes are superposed on the splitting plane BS therein to allow the luminous fluxes to interfere with each other, and the luminous fluxes are converted into brightness-darkness signal luminous flux, thus entering the photoelectric element 10. In this way, the brightness-darkness signal on the basis of the rotation of the disc 6a is obtained from the photoelectric element 10 to obtain the rotational information of the disc 6a in accordance with the foregoing equation.

The luminous flux separating means in the present embodiment is equally applicable to a linear encoder besides the rotary encoder.

Figure 20:
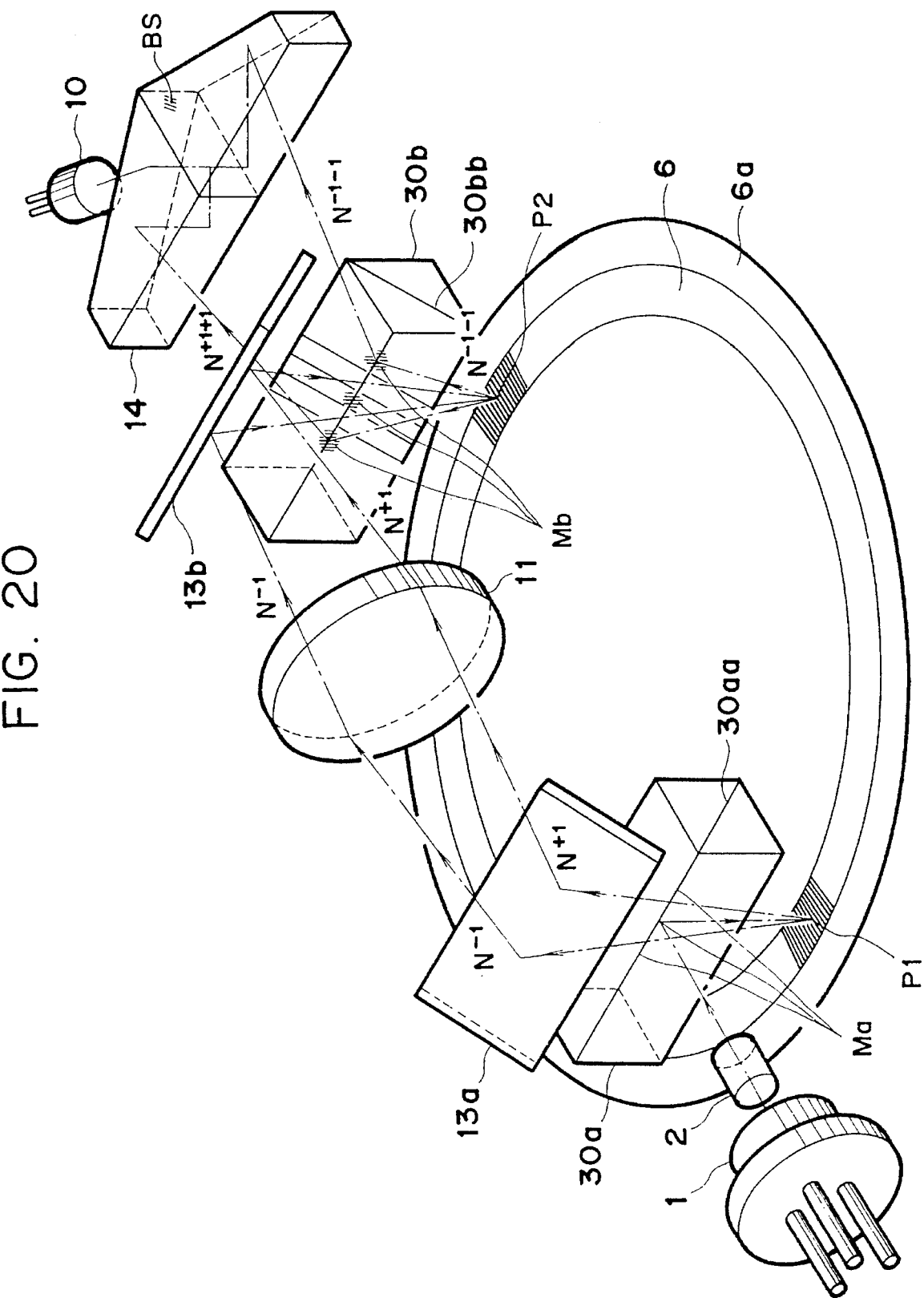
FIG. 20 is a view schematically showing a principal part of the twelfth embodiment of the present invention.

FIG. 20 is a view schematically showing the principal part of the twelfth embodiment of the present invention.

The present embodiment is such that after the laser beam from the laser 1 is reflected by the reflective plane of luminous flux separating means 30a through the collimator lens 2, the lights enter the radial grating 6 on the disc 6a, and only the diffracted light of the required order from the radial grating 6 is transmitted through the transmittable plane. The other diffracted light is reflected to be directed to the other direction such as a point Ma. The light thus transmitted is reflected by the reflective plane 13a and guided to the lens 11, and further reflected by the reflective plane 13b. The arrangement of the reflective portion and transmittable portion of the luminous flux separating means 30b are reversed to allow the reflectively emitted light to enter the Kösters' prism 14 as it is. These points are what differ from the eleventh embodiment. All the other structures are substantially the same. Although the number of the reflective members is slightly increased, this structure also enables the arrangement of the light guide system to be comparatively simple.

When the present embodiment is partially modified as set forth below, the present invention is equally applicable.

(f) Luminous flux separating means is replaced with a flat reflective member (such as glass plate on which a reflective film is locally deposited).

(g) The optical system is modified to such one that the light is drawn in such a manner that one of the two required diffracted lights diffracted from the radial grating is reflected, and the other is transmitted.

(h) The embodiment is adopted for the use a "transmitting type" rotary encoder where the required two diffracted lights are drawn from the opposite side of a scale.

(i) The reflective portion is replaced by one having a curved surface.

According to each of the above-mentioned embodiments, it is possible to provide a rotary encoder in which each element can be assembled and adjusted easily by arranging appropriately the detection unit when the rotary encoder is structured as a built-in type, thus not to be easily affected by any assembling errors as described earlier, and which is also capable of detecting the rotational information with high precision while scarcely affected by errors in mounting the disc unit on a rotational object.

Particularly, in these embodiments, it is possible to obtain the following advantages among others:

(1) Since there is provided a compensating optical system including lenses so as not to generate any "disturbance of interference signal =fluctuation of output amplitude" and "degradation of measuring precisions" due to inclination or eccentricity apt to take place in mounting the disc. Accordingly, the accuracy upon setting in mounting the encoder in an apparatus is not so strict. Thus, it is easier for the user to mount the encoder.

(2) The number of optical components is small and also, the optical length to the light receiving element is short. It is therefore easy to perform the adjustments required to match optical paths (encoder assembling adjustment). Also, the machining precisions are not so severe as compared with the conventional example. The cost can be reduced that much.

(3) It is easy to make the encoder compact.

In addition, as described in FIG. 19 and FIG. 20, the structure can be arranged so that the relationship between reflection and transmission for both "luminous flux advancing toward diffraction grating array" and "diffracted light having specific orders" is reversed by the use of luminous flux separating means, and the effect as light shielding mask is provided against any unnecessary diffracted light (zeroth light =including positive reflection light) from the viewpoint of diffracted light utilization. As a result, it is possible to provide a rotary encoder of a diffraction light interference type attempting the simplification of an apparatus as a whole, by enabling diffracted light of a specific order to be separated and drawn in a short distance from the diffraction grating array.

Also, particularly, there are the following advantages:

(4) The "unnecessary diffracted light" by which problems arise particularly when the encoder is made compact, is cut off. It is therefore possible to obtain stable signals which are hardly affected by ghost light.

(5) Any expensive component such as crystalline optical element is not used, and also the number of optical components is small (because the functions as beam splitting and masking are effectuated at the same time), thus reducing the cost significantly.

(6) Since the optical path length to the light receiving element can be shortened, it is easy to make adjustments (encoder assembling adjustments) to match optical paths. Also, the machining precisions required for the optical components are not necessarily so severe, thus attaining the cost reduction.

In each of the embodiments, it is possible to make the structure comparatively simple for light guide optical system from the point P1 to the point P2 which must be arranged closely to the diffraction grating sides. Consequently, the relative arrangements of the disc unit and detection unit can be made with a higher flexibility and safety.

What is claimed is:

1. An apparatus for measuring rotational information of a rotating object, comprising:

a rotatable diffraction grating having a center at substantially a center of rotation;

a light source;

an irradiating optical system for irradiating one luminous flux from said light source to a first point on said diffraction grating;

optical means for guiding first and second diffracted luminous fluxes emerging from the first point at respective emerging angles and diffracted to have a same order but different signs to be incident at a second point on said diffraction grating at respective incident angles relative to a rotational direction of said grating, with the second point positioned substantially opposite to the first point on said diffraction grating with respect to the center of rotation, wherein the first diffracted luminous flux is irradiated from the first point to the rotational direction relative to an axis normal to said diffraction grating and is incident on the second point from a direction opposite to the rotational direction relative to the normal axis of said diffraction grating, and the second diffracted luminous flux is irradiated from the first point in the direction opposite to the rotational direction relative to the normal axis of said diffraction grating and is incident on the second point from the rotational direction relative to the normal line of said diffraction grating;

a wave superposing optical system for superposing the two rediffracted fluxes diffracted at the second point with the order of the same signs at the first point, respectively, wherein the two rediffracted fluxes are irradiated from the second point in a direction different from their respective incident angles; and detectors for detecting said superposed rediffracted lights, whereby the rotational information of the rotating object is measured.

2. An apparatus according to claim 1, further comprising a housing, wherein said light source, said irradiating optical system, said optical means, said wave superposing optical system, and said detectors are housed in said housing.

3. An apparatus according to claim 1, wherein said optical means includes one lens group and the two diffracted lights are respectively transmitted through the corresponding sides of two areas symmetrical to an optical axis of said lens group.

4. An apparatus according to claim 1, wherein said optical means includes one spherical lens group and first and second cylindrical lens groups arranged on the first point and the second point sides, respectively, and the two diffracted lights are transmitted through the corresponding sides of two areas symmetrical to an optical axis of said spherical lens group.

5. An apparatus according to claim 4, wherein said spherical lens group is arranged to image the first point on the second point by an equal time with respect to a circumferential direction of said diffraction grating array, and said two cylindrical lens groups are arranged to have refractive power with respect to a direction corresponding to a radial direction of said diffraction grating array to image the first point on the second point with respect to the radial direction by cooperation of said first and second cylindrical lens groups and said spherical lens group.

6. An apparatus according to claim 5, wherein said first cylindrical lens group proximate to the first point side images the first point once in the vicinity of said spherical lens groups with respect to the radial direction.

7. An apparatus according to claim 1, wherein said optical means includes a beam splitter for guiding the two diffracted lights to the second point and guiding the two rediffracted lights from the second point to said wave superposing optical system, said beam splitter includes a surface on which there is commonly formed a light reflection portion for reflecting the two diffracted lights and one of the rediffracted lights and a light transmitting portion for transmitting the other rediffracted light.

8. An apparatus according to claim 1, wherein said optical means includes a beam splitter for guiding light from said irradiating optical system to the first point and guiding the two diffracted lights from the first point to the second point, and said beam splitter includes a surface on which there is commonly formed a light reflection portion for reflecting the two diffracted lights and one of the rediffracted lights from said irradiating optical system and a light transmitting portion for transmitting the other rediffracted light.

9. An apparatus according to claim 1, wherein said optical means guides the first and second diffracted luminous fluxes emerging from the first point along respective incident optical paths to be incident at the second point on said diffraction grating and guides each of the first and second rediffracted lights emerging from the second point along a path outside of their respective incident optical paths.

* * * * *

UNITED STATES PATENT AND TRADEMARK OFFICE
CERTIFICATE OF CORRECTION

PATENT NO. : 5,532,819        Page 1 of 2
DATED : July 2, 1996
INVENTOR(S) : Ishizuka et al.

It is certified that error appears in the above-indentified patent and that said Letters Patent is hereby corrected as shown below:

COLUMN 5:

Line 10, "after" should read --after being--.
Line 49, "after" should read --after being--.

COLUMN 8:

Line 5, "K" should be deleted.
Line 6, "östers'" should read --Kösters'--.
Line 57, "K" should be deleted.
Line 58, "östers'" should read --Kösters'--.

COLUMN 9:

Line 16, "reflected-at" should read --reflected at--.
Line 33, "comprising" should read --comprise--.

COLUMN 13:

Line 8, "is" should read --are--.
Line 24, "deteriorates." should read --deteriorate.--.
Line 51, "K" should be deleted.
Line 52, "östers'" should read --Kösters'--.
Line 57, "lights p+1+1" should read --lights $p^{+1+1}$--.
Line 59, "is" should read --are--.

UNITED STATES PATENT AND TRADEMARK OFFICE
CERTIFICATE OF CORRECTION

PATENT NO. : 5,532,819
DATED : July 2, 1996
INVENTOR(S) : Ishizuka et al.

It is certified that error appears in the above-indentified patent and that said Letters Patent is hereby corrected as shown below:

COLUMN 14:

Line 23, "K" should be deleted.
Line 24, "östers'" should read --Kösters'--.

COLUMN 15:

Line 40, "fluxes N+1" should read --fluxes $N^{+1}$--.

COLUMN 16:

Line 34, "the use a" should read --use in a--.

Signed and Sealed this

Twenty-second Day of October, 1996

Attest:

BRUCE LEHMAN

Attesting Officer   Commissioner of Patents and Trademarks